(12) United States Patent
Brett

(10) Patent No.: US 8,538,856 B2
(45) Date of Patent: *Sep. 17, 2013

(54) COMPUTER-BASED RIGHT DISTRIBUTION SYSTEM

(75) Inventor: Kenton F. Brett, Indianapolis, IN (US)

(73) Assignee: Ticketmaster, L.L.C., West Hollywood, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 12/758,437

(22) Filed: Apr. 12, 2010

(65) Prior Publication Data

US 2010/0217629 A1     Aug. 26, 2010

Related U.S. Application Data

(60) Division of application No. 11/453,286, filed on Jun. 14, 2006, now Pat. No. 7,698,210, which is a continuation of application No. 11/059,990, filed on Feb. 17, 2005, now Pat. No. 7,747,507, which is a continuation-in-part of application No. 09/778,606, filed on Feb. 7, 2001, now Pat. No. 6,907,405, which is a continuation-in-part of application No. 09/586,927, filed on Jun. 5, 2000, now Pat. No. 6,704,713, which is a continuation of application No. PCT/US00/03136, filed on Feb. 7, 2000, which is a continuation-in-part of application No. 08/862,547, filed on May 23, 1997, now Pat. No. 6,023,685.

(60) Provisional application No. 60/018,211, filed on May 23, 1996.

(51) Int. Cl.
*G06Q 40/00*         (2012.01)

(52) U.S. Cl.
USPC ......................................................... 705/37

(58) Field of Classification Search
USPC ........................................................... 705/37
See application file for complete search history.

(56) References Cited

U.S. PATENT DOCUMENTS 3,581,072 A    5/1971   Nymeyer
3,622,995 A   11/1971   Dilks (Continued)

FOREIGN PATENT DOCUMENTS

EP       0828223 A2    3/1998
EP       1069539 A2    1/2001

(Continued)

OTHER PUBLICATIONS

"Acteva and Enspot.com Sign Agreement to Provide On-Line Ticketing, Broader Distribution", Business Wire (Dec. 3, 1999).

(Continued)

*Primary Examiner* — Olabode Akintola
(74) *Attorney, Agent, or Firm* — Kilpatrick Townsend & Stockton LLP

(57) ABSTRACT

An automated ticket auctioning system receives and evaluates bid information records received from a plurality of remote terminals. Each bid information record corresponds to at least one bid for one or more desired seats at a venue. Each bid information record may also include a plurality of additional bids identified for different seats in the venue. The separate bids in each bid information record are prioritized. The automated ticket auctioning system includes a central controlling computer operable to receive the bid information records and determine, in order of priority, whether any of the bids in a bid information record is accepted. If one bid in a bid information record is accepted, all lower priority bids in that bid information record are dismissed.

24 Claims, 34 Drawing Sheets

(56) References Cited

U.S. PATENT DOCUMENTS

| | | | |
|---|---|---|---|
| 4,412,287 | A | 10/1983 | Braddock, III |
| 4,603,232 | A | 7/1986 | Kurland et al. |
| 4,788,643 | A | 11/1988 | Trippe et al. |
| 4,789,928 | A | 12/1988 | Fujisaki |
| 4,799,156 | A | 1/1989 | Shavit et al. |
| 4,816,904 | A | 3/1989 | McKenna et al. |
| 4,845,739 | A | 7/1989 | Katz |
| 4,862,357 | A | 8/1989 | Ahlstrom et al. |
| 4,889,280 | A | 12/1989 | Gradl et al. |
| 4,980,826 | A | 12/1990 | Wagner |
| 5,077,665 | A | 12/1991 | Silverman et al. |
| 5,101,353 | A | 3/1992 | Lupien et al. |
| 5,112,050 | A | 5/1992 | Koza et al. |
| 5,136,501 | A | 8/1992 | Silverman et al. |
| 5,181,786 | A | 1/1993 | Hujink |
| 5,237,499 | A | 8/1993 | Garback |
| 5,239,480 | A | 8/1993 | Huegel |
| 5,253,165 | A | 10/1993 | Leiseca et al. |
| 5,265,916 | A | 11/1993 | Coe |
| 5,283,734 | A | 2/1994 | Von Kohorn |
| 5,311,425 | A | 5/1994 | Inada |
| 5,329,589 | A | 7/1994 | Fraser et al. |
| 5,333,257 | A | 7/1994 | Merrill et al. |
| 5,347,306 | A | 9/1994 | Nitta |
| 5,408,417 | A * | 4/1995 | Wilder ............... 705/5 |
| 5,422,809 | A | 6/1995 | Griffin et al. |
| 5,426,281 | A | 6/1995 | Abecassis |
| 5,428,778 | A | 6/1995 | Brookes |
| 5,475,585 | A | 12/1995 | Bush |
| 5,489,096 | A | 2/1996 | Aron |
| 5,518,239 | A | 5/1996 | Johnston |
| 5,553,145 | A | 9/1996 | Micali |
| 5,557,518 | A | 9/1996 | Rosen |
| 5,559,707 | A | 9/1996 | DeLorme et al. |
| 5,592,375 | A | 1/1997 | Salmon et al. |
| 5,598,477 | A | 1/1997 | Berson |
| 5,664,115 | A | 9/1997 | Fraser |
| 5,724,520 | A | 3/1998 | Goheen |
| 5,737,363 | A * | 4/1998 | Dinkins ............... 375/219 |
| 5,742,763 | A | 4/1998 | Jones |
| 5,754,654 | A | 5/1998 | Hiroya et al. |
| 5,757,917 | A | 5/1998 | Rose et al. |
| 5,774,873 | A | 6/1998 | Berent et al. |
| 5,794,207 | A | 8/1998 | Walker et al. |
| 5,794,210 | A | 8/1998 | Goldhaber et al. |
| 5,794,219 | A | 8/1998 | Brown |
| 5,797,126 | A * | 8/1998 | Helbling et al. ............ 705/5 |
| 5,812,670 | A | 9/1998 | Micali |
| 5,818,914 | A | 10/1998 | Fujisaki |
| 5,826,241 | A | 10/1998 | Stein et al. |
| 5,835,896 | A * | 11/1998 | Fisher et al. ............. 705/37 |
| 5,845,265 | A * | 12/1998 | Woolston ............... 705/37 |
| 5,845,266 | A | 12/1998 | Lupien et al. |
| 5,850,442 | A | 12/1998 | Muftic |
| 5,890,138 | A | 3/1999 | Godin et al. |
| 5,918,209 | A | 6/1999 | Campbell et al. |
| 5,930,761 | A | 7/1999 | O'Toole |
| 6,023,685 | A | 2/2000 | Brett et al. |
| 6,023,686 | A | 2/2000 | Brown |
| 6,026,383 | A | 2/2000 | Ausubel |
| 6,044,363 | A | 3/2000 | Mori et al. |
| 6,047,264 | A | 4/2000 | Fisher et al. |
| 6,048,271 | A | 4/2000 | Barcelou |
| 6,067,532 | A | 5/2000 | Gebb |
| 6,070,146 | A | 5/2000 | Mimata |
| 6,082,620 | A | 7/2000 | Bone, Jr. |
| 6,085,164 | A | 7/2000 | Smith et al. |
| 6,085,169 | A | 7/2000 | Walker et al. |
| 6,085,976 | A | 7/2000 | Sehr |
| 6,094,640 | A | 7/2000 | Goheen |
| 6,107,932 | A | 8/2000 | Walker et al. |
| 6,119,096 | A | 9/2000 | Mann et al. |
| 6,119,945 | A | 9/2000 | Muller et al. |
| 6,175,922 | B1 | 1/2001 | Wang et al. |
| 6,192,349 | B1 | 2/2001 | Husemann et al. |
| 6,216,227 | B1 | 4/2001 | Goldstein et al. |
| 6,223,166 | B1 | 4/2001 | Kay |
| 6,230,146 | B1 | 5/2001 | Alaia et al. |
| 6,240,396 | B1 | 5/2001 | Walker et al. |
| 6,243,691 | B1 | 6/2001 | Fisher et al. |
| 6,246,996 | B1 | 6/2001 | Stein et al. |
| 6,308,159 | B1 | 10/2001 | Strohl |
| 6,341,353 | B1 | 1/2002 | Herman et al. |
| 6,418,415 | B1 | 7/2002 | Walker et al. |
| 6,434,398 | B1 | 8/2002 | Inselberg |
| 6,446,045 | B1 | 9/2002 | Stone et al. |
| 6,449,346 | B1 | 9/2002 | Katz |
| 6,466,917 | B1 | 10/2002 | Goyal et al. |
| 6,470,451 | B1 | 10/2002 | Weinstein |
| 6,477,503 | B1 | 11/2002 | Mankes |
| 6,484,153 | B1 | 11/2002 | Walker et al. |
| 6,496,809 | B1 | 12/2002 | Nakfoor |
| 6,523,037 | B1 | 2/2003 | Monahan et al. |
| 6,603,568 | B1 | 8/2003 | Sansone |
| 6,604,107 | B1 | 8/2003 | Wang |
| 6,658,390 | B1 | 12/2003 | Walker et al. |
| 6,662,230 | B1 | 12/2003 | Eichstaedt et al. |
| 6,679,421 | B2 | 1/2004 | Shin et al. |
| 6,685,093 | B2 | 2/2004 | Challa et al. |
| 6,690,794 | B1 | 2/2004 | Terao et al. |
| 6,704,713 | B1 | 3/2004 | Brett et al. |
| 6,736,322 | B2 | 5/2004 | Gobburu et al. |
| 6,820,201 | B1 | 11/2004 | Lincoln et al. |
| 6,842,741 | B1 | 1/2005 | Fujimura |
| 6,854,651 | B2 | 2/2005 | Smith et al. |
| 6,877,661 | B2 | 4/2005 | Webb et al. |
| 6,877,665 | B2 | 4/2005 | Challa et al. |
| 6,901,429 | B2 | 5/2005 | Dowling |
| 6,907,405 | B2 | 6/2005 | Brett |
| 6,910,019 | B2 | 6/2005 | Dorr |
| 6,910,627 | B1 | 6/2005 | Simpson-Young et al. |
| 6,920,428 | B2 | 7/2005 | Greene |
| 6,944,599 | B1 | 9/2005 | Vogel et al. |
| 6,963,854 | B1 | 11/2005 | Boyd et al. |
| 6,965,914 | B2 | 11/2005 | Dowling |
| 6,999,936 | B2 | 2/2006 | Sehr |
| 7,003,485 | B1 | 2/2006 | Young |
| 7,004,388 | B2 | 2/2006 | Kohita |
| 7,010,494 | B2 | 3/2006 | Etzioni et al. |
| 7,031,945 | B1 | 4/2006 | Donner |
| 7,044,362 | B2 | 5/2006 | Yu |
| 7,058,602 | B1 | 6/2006 | La Mura et al. |
| 7,069,243 | B2 | 6/2006 | Dinwoodie |
| 7,076,460 | B2 | 7/2006 | Dinwoodie |
| 7,076,558 | B1 | 7/2006 | Dunn |
| 7,080,026 | B2 | 7/2006 | Singh et al. |
| 7,080,030 | B2 | 7/2006 | Eglen et al. |
| 7,080,328 | B1 | 7/2006 | Sawyer |
| 7,080,882 | B2 | 7/2006 | Stitt |
| 7,083,081 | B2 | 8/2006 | McGee et al. |
| 7,085,818 | B2 | 8/2006 | Brown et al. |
| 7,092,892 | B1 | 8/2006 | Sobalvarro et al. |
| 7,093,130 | B1 | 8/2006 | Kobayashi et al. |
| 7,099,841 | B1 | 8/2006 | Hall et al. |
| 7,110,960 | B2 | 9/2006 | Phillips et al. |
| 7,114,179 | B1 | 9/2006 | Ritter et al. |
| 7,127,404 | B1 | 10/2006 | Poon |
| 7,127,408 | B2 | 10/2006 | Rosen |
| 7,133,848 | B2 | 11/2006 | Phillips et al. |
| 7,139,916 | B2 | 11/2006 | Billingsley et al. |
| 7,149,549 | B1 | 12/2006 | Ortiz et al. |
| 7,152,043 | B2 | 12/2006 | Alaia et al. |
| 7,162,454 | B1 | 1/2007 | Donner et al. |
| 7,191,147 | B2 | 3/2007 | Heene et al. |
| 7,333,943 | B1 | 2/2008 | Charuk et al. |
| 7,647,269 | B2 | 1/2010 | Brett |
| 7,698,210 | B2 | 4/2010 | Brett |
| 7,720,746 | B2 | 5/2010 | Brett |
| 7,747,507 | B2 | 6/2010 | Brett |
| 7,769,673 | B2 | 8/2010 | Brett |
| 8,073,765 | B2 | 12/2011 | Brett |
| 2001/0034687 | A1 | 10/2001 | Bushonville et al. |
| 2001/0049652 | A1 | 12/2001 | Nakajima |
| 2002/0004762 | A1 | 1/2002 | Izumoto |

| | | |
|---|---|---|
| 2002/0023955 A1 | 2/2002 | Frank et al. |
| 2002/0040308 A1 | 4/2002 | Hasegawa et al. |
| 2002/0040346 A1 | 4/2002 | Kwan |
| 2002/0042729 A1 | 4/2002 | Yajima et al. |
| 2002/0052758 A1 | 5/2002 | Arthur et al. |
| 2002/0052965 A1 | 5/2002 | Dowling |
| 2002/0062265 A1 | 5/2002 | Poon |
| 2002/0065763 A1 | 5/2002 | Taylor et al. |
| 2002/0065783 A1 | 5/2002 | Na et al. |
| 2002/0072999 A1 | 6/2002 | Andres et al. |
| 2002/0082879 A1 | 6/2002 | Miller et al. |
| 2002/0082969 A1 | 6/2002 | O'Keefe et al. |
| 2002/0087456 A1 | 7/2002 | Abeshouse et al. |
| 2002/0091555 A1 | 7/2002 | Leppink |
| 2002/0094090 A1 | 7/2002 | Lino |
| 2002/0095357 A1 | 7/2002 | Hunter et al. |
| 2002/0103849 A1 | 8/2002 | Smith |
| 2002/0107779 A1 | 8/2002 | Maltzman |
| 2002/0116343 A1 | 8/2002 | Nakamura et al. |
| 2002/0128922 A1 | 9/2002 | Joao |
| 2002/0138325 A1 | 9/2002 | Mashimo et al. |
| 2002/0138751 A1 | 9/2002 | Dutta |
| 2002/0138770 A1 | 9/2002 | Dutta |
| 2002/0143860 A1 | 10/2002 | Catan |
| 2002/0156715 A1 | 10/2002 | Wall et al. |
| 2002/0169623 A1 | 11/2002 | Call et al. |
| 2002/0178093 A1 | 11/2002 | Dean et al. |
| 2002/0188523 A1 | 12/2002 | Hyyppa et al. |
| 2002/0188551 A1 | 12/2002 | Grove et al. |
| 2003/0024988 A1 | 2/2003 | Stanard |
| 2003/0040943 A1 | 2/2003 | Bates et al. |
| 2003/0061303 A1 | 3/2003 | Brown et al. |
| 2003/0067464 A1 | 4/2003 | Gathman et al. |
| 2003/0069762 A1 | 4/2003 | Gathman et al. |
| 2003/0069763 A1 | 4/2003 | Gathman et al. |
| 2003/0069764 A1 | 4/2003 | Gathman et al. |
| 2003/0069789 A1 | 4/2003 | Gathman et al. |
| 2003/0069810 A1 | 4/2003 | Gathman et al. |
| 2003/0069827 A1 | 4/2003 | Gathman et al. |
| 2003/0069829 A1 | 4/2003 | Gathman et al. |
| 2003/0105641 A1 | 6/2003 | Lewis |
| 2003/0154142 A1 | 8/2003 | Ginsburg et al. |
| 2003/0154169 A1 | 8/2003 | Yanai |
| 2003/0163373 A1 | 8/2003 | Cornateanu |
| 2003/0164400 A1 | 9/2003 | Boyd |
| 2003/0171960 A1 | 9/2003 | Skinner |
| 2003/0177022 A1 | 9/2003 | Francis |
| 2003/0187802 A1 | 10/2003 | Booth |
| 2003/0229790 A1 | 12/2003 | Russell |
| 2003/0236736 A1 | 12/2003 | Harmon et al. |
| 2004/0006497 A1 | 1/2004 | Nestor et al. |
| 2004/0019571 A1 | 1/2004 | Hurwitz et al. |
| 2004/0039635 A1 | 2/2004 | Linde et al. |
| 2004/0039696 A1 | 2/2004 | Harmon et al. |
| 2004/0049412 A1 | 3/2004 | Johnson |
| 2004/0073439 A1 | 4/2004 | Shuster |
| 2004/0083156 A1 | 4/2004 | Schulze |
| 2004/0086257 A1 | 5/2004 | Werberg et al. |
| 2004/0093175 A1 | 5/2004 | Tan |
| 2004/0111303 A1 | 6/2004 | Francis |
| 2004/0128257 A1 | 7/2004 | Okamoto et al. |
| 2004/0128516 A1 | 7/2004 | Okamoto et al. |
| 2004/0138962 A1 | 7/2004 | Kopelman et al. |
| 2004/0172270 A1 | 9/2004 | Sugimoto et al. |
| 2004/0204990 A1 | 10/2004 | Lee et al. |
| 2004/0204991 A1 | 10/2004 | Monahan et al. |
| 2004/0215527 A1 | 10/2004 | Grove et al. |
| 2004/0220821 A1 | 11/2004 | Ericsson et al. |
| 2005/0001711 A1 | 1/2005 | Doughty et al. |
| 2005/0015303 A1 | 1/2005 | Dubin et al. |
| 2005/0015308 A1 | 1/2005 | Grove et al. |
| 2005/0021364 A1 | 1/2005 | Nakfoor |
| 2005/0021365 A1 | 1/2005 | Nakfoor |
| 2005/0027608 A1 | 2/2005 | Wiesmuller et al. |
| 2005/0027641 A1 | 2/2005 | Grove et al. |
| 2005/0043994 A1 | 2/2005 | Walker et al. |
| 2005/0065866 A1 | 3/2005 | Grove et al. |
| 2005/0071245 A1 | 3/2005 | Norins, Jr. et al. |
| 2005/0131809 A1 | 6/2005 | Watt, II et al. |
| 2005/0139661 A1 | 6/2005 | Eglen et al. |
| 2005/0139662 A1 | 6/2005 | Eglen et al. |
| 2005/0140675 A1 | 6/2005 | Billingsley et al. |
| 2005/0144115 A1 | 6/2005 | Brett |
| 2005/0149458 A1 | 7/2005 | Eglen et al. |
| 2005/0160020 A1 | 7/2005 | Asher et al. |
| 2005/0165758 A1 | 7/2005 | Kasten et al. |
| 2005/0209954 A1 | 9/2005 | Asher et al. |
| 2005/0228722 A1 | 10/2005 | Embree |
| 2005/0240453 A1 | 10/2005 | Lyons |
| 2005/0273405 A1 | 12/2005 | Chen |
| 2006/0017541 A1 | 1/2006 | Nguyen |
| 2006/0085396 A1 | 4/2006 | Evans et al. |
| 2006/0095344 A1 | 5/2006 | Nakfoor |
| 2006/0100985 A1 | 5/2006 | Mark et al. |
| 2006/0105783 A1 | 5/2006 | Giraldin et al. |
| 2006/0108418 A1 | 5/2006 | Rice |
| 2006/0111967 A1 | 5/2006 | Forbes |
| 2006/0116916 A1 | 6/2006 | Bowman et al. |
| 2006/0124734 A1 | 6/2006 | Wallerstorfer et al. |
| 2006/0140374 A1 | 6/2006 | Light et al. |
| 2006/0143094 A1 | 6/2006 | Kohout et al. |
| 2006/0143109 A1 | 6/2006 | Goel |
| 2006/0143698 A1 | 6/2006 | Ohara |
| 2006/0144946 A1 | 7/2006 | Kuriyama et al. |
| 2006/0148566 A1 | 7/2006 | Lakshminarasimha |
| 2006/0155659 A1 | 7/2006 | DiCesare |
| 2006/0161474 A1 | 7/2006 | Diamond et al. |
| 2006/0167756 A1 | 7/2006 | VonBergen et al. |
| 2006/0178930 A1 | 8/2006 | Kim |
| 2006/0190387 A1 | 8/2006 | Molloy |
| 2006/0190388 A1 | 8/2006 | Molloy |
| 2006/0190389 A1 | 8/2006 | Molloy |
| 2006/0190390 A1 | 8/2006 | Molloy |
| 2006/0195356 A1 | 8/2006 | Nerenhausen et al. |
| 2006/0232110 A1 | 10/2006 | Ovadia |
| 2006/0244564 A1 | 11/2006 | Madsen |
| 2006/0249572 A1 | 11/2006 | Chen et al. |
| 2006/0271462 A1 | 11/2006 | Harmon |
| 2006/0277130 A1 | 12/2006 | Harmon |
| 2006/0293929 A1 | 12/2006 | Wu et al. |
| 2006/0293994 A1 | 12/2006 | Stuart |
| 2007/0012765 A1 | 1/2007 | Trinquet et al. |
| 2007/0017979 A1 | 1/2007 | Wu et al. |
| 2007/0027798 A1 | 2/2007 | Brett |
| 2007/0055554 A1 | 3/2007 | Sussman et al. |

FOREIGN PATENT DOCUMENTS

| | | |
|---|---|---|
| JP | 5204952 | 8/1993 |
| JP | 5266049 | 10/1993 |
| JP | 10-289281 | 10/1998 |
| JP | 11-031186 | 2/1999 |
| JP | 11031204 A | 2/1999 |
| JP | 3061933 | 6/1999 |
| JP | 11-353361 | 12/1999 |
| WO | WO 88/03295 | 5/1988 |
| WO | WO 99/06928 | 2/1999 |
| WO | WO 99/27476 | 6/1999 |
| WO | WO 99/60489 | 11/1999 |
| WO | WO 00/62260 | 10/2000 |
| WO | WO 00/74300 A1 | 12/2000 |
| WO | WO 00/75838 A1 | 12/2000 |
| WO | WO 01/08065 A1 | 2/2001 |
| WO | WO 01/41021 A1 | 6/2001 |
| WO | WO 01/41085 A2 | 6/2001 |
| WO | WO 01/44892 A2 | 6/2001 |
| WO | WO 01/52139 A1 | 7/2001 |
| WO | WO 01/59649 A1 | 8/2001 |
| WO | WO 01/59658 A1 | 8/2001 |
| WO | WO 01/71669 A2 | 9/2001 |
| WO | WO 01/84473 | 11/2001 |
| WO | WO 02/03174 | 1/2002 |
| WO | WO 02/35322 A2 | 5/2002 |
| WO | WO 03/027808 A2 | 4/2003 |

OTHER PUBLICATIONS

"AuctionNet Still One-Of-A-Kind", Automotive News, S12 (Sep. 20, 1993).

"Cathay Pacific Airways Auctions a Boeing 747-400 Worth of Seats in Third Cybertraveler Auction", Business Wire (Apr. 29, 1996).
"Cathay Pacific Airways-USA Receives More than 1,300 Bids During First Five Days of CyberAuction", Business Wire (Oct. 18, 1995).
"Cathay Pacific Airways-USA to Hold First-Ever Internet CyberAuction", Business Wire (Sep. 26, 1995).
"E-TicketBoard Launches PSL Xchange for Eight NFL Teams", PR Newswire (Jul. 18, 2000).
"E-TicketBoard Launches Revolutionary New Site—SeatsandSuites", PR Newswire (Oct. 17, 2000).
"Keyware Unveils Multi-Application Smart Card Suite", Card News, vol. 16, No. 10 (May 30, 2001).
"Online Movie Ticket Site Launched in China", China Online (Dec. 23, 1999).
"OnSale Brings Thrill of the Auction to the Web", Link-up p. 34 (Jul./Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link-Up, p. 10 (Sep./Oct. 1988).
Banâtre, "Distributed Auction Bidding System", International Computing Symposium, vol. 4, No. 4 (Aug. 1981).
Banks, "PSL Put Owners on the Hot Seat", St. Petersburg Times, p. 10C (Oct. 31, 1993).
Beam et al, "Electronic Negotiation through Internet-Based Auctions", CITM Working Paper 96-WP-1019, http://haas.berkeley.edu/citm/publications/papers/wp-1019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Business Wire, "Cathay Pacific Airway Auctions a Boeing 747-400 worth of seats in Third Cybertraveler Auction," Apr. 29, 1996.
Collier, "Columbia, S.C.-Based Internet Firm Helps Buy, Sell Sports Tickets", The State, (Oct. 23, 2000).
Office Action dated Mar. 9, 2009 (Japanese Patent Application No. 2001-558899) (English Translation).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
European Search Report dated Jan. 29, 2008; European Application No. 07 01 8280.
Garza, "Space Cruise", Reason (May 2000).
Happel, "Creating a Futures Market for Major Event Tickets: Problems and Prospects", Cato Journal, vol. 21, No. 3 (Winter 2002).
Harlan, "At Least it isn't the Team's Ball that's in Somebody Else's Court", Wall Street Journal (Jun. 4, 1991).
Hayashi, Nobuyuki, "Great-bargain Malls Come to Your Home: Attractive, Easy-to-get-hooked Internet Auction" MAC Power, ASCII Corporation, Dec. 1, 1999, $10^{th}$ volume, $12^{th}$ issue, pp. 252 to 257 (with Partial english translation).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
International Search Report for PCT Application—PCT/US06/10295, mailing date Sep. 14, 2007.
Isokawa, Akiko, the $25^{th}$ "Using Convenient Internet Sites", Nikkei PC21, Nikkei Business Publications, Inc., Jan. 1, 2000, $5^{th}$ Volume, $1^{st}$ issue, pp. 248 to 251 (with Partial english translation).
Jackson, "Media Futures: This Bazaar Could Put Retailers Under the Hammer", Financial Times (May 25, 1995).

Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000.
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Nestor et al, "Transforming Tickets from a Commodity into a Valuable Strategic Asset", Global eTicket Exchange whitepaper, Oct. 13, 2000.
Office Action mailed on Jul. 27, 2007 in U.S. Appl. No. 11/475,733.
O'Neil, "Q and A", St. Louis Post-Dispatch, p. 4D (Jan. 19, 1995).
Pelline, J. ("Cathay Pacific to Auction off Airline Tickets on the Internet" San Francisco Chronicle, Apr. 30, 1999, p. 3) teaches online auction of tickets whereby bidder must sign up as "cybertravelers" prior to auction.
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
www.TicketOptions.com Web Pages, as retreived from archive.org (2001).
wwwSeasonTicket.com Web Pages, as retreived from archive.org (2001).
Zoltak, "Advantix Acquisitions Continue with Protix Deal", Amusement Business (Nov. 2, 1998).

* cited by examiner

FIG. 5a

Table: Main Auction Database

| Field Name | Data Type | Description | |
|---|---|---|---|
| BIDID | Counter | Bid ID# | (indexed) |
| SXN | Text | Section | text |
| ARIGHTS | Number | # of rights requested | integer |
| RRIGHTS | Number | # of rights received | integer |
| ABID | Number | $ amount bid | integer |
| RANK | Number | rank for this section | integer |
| FRIGHTID | Number | first right ID # | integer |
| LRIGHTID | Number | last right ID # | integer |
| BIDDERID | Number | bidder ID # | integer |

FIG. 5b

Table: Main Auction Database

| BIDID | SXN | ARIGHTS | RRIGHTS | ABID | RANK | FRIGHTID | LRIGHTID | BIDDERID |
|---|---|---|---|---|---|---|---|---|
| 1 | a | 2 | 2 | 30 | 1 | 1 | 2 | 3 |
| 2 | a | 4 | 4 | 28 | 2 | 3 | 6 | 1 |
| 3 | a | 2 | 1 | 15 | 6 | 12 | 12 | 5 |
| 4 | a | 2 | 2 | 19 | 5 | 10 | 11 | 2 |
| 5 | a | 2 | 2 | 24 | 4 | 8 | 9 | 6 |
| 6 | a | 1 | 1 | 25 | 3 | 7 | 7 | 4 |

(Counter)

FIG. 6a

Table: Seating Database

| Field Name | Data Type | Description | |
|---|---|---|---|
| RIGHTID | Counter | | (indexed) |
| SECTION | Text | section | text |
| SUBSECTION | Text | subsection | text |
| RIGHT | Number | right number | integer |
| MINBID | Number | starting minimum bid | integer |
| STNDBID | Number | standing bid for this seat | integer |
| BIDID | Number | bid ID # | integer |

FIG. 6b

Table: Priority Right Database

| RIGHTID | SECTION | SUB-SECTION | RIGHT | MINBID | STNDBID | BIDID |
|---|---|---|---|---|---|---|
| 1 | a | 1 | 1 | 15 | 30 | 1 |
| 2 | a | 1 | 2 | 15 | 30 | 1 |
| 3 | a | 1 | 3 | 15 | 28 | 2 |
| 4 | a | 2 | 1 | 15 | 28 | 2 |
| 5 | a | 2 | 2 | 15 | 28 | 2 |
| 6 | a | 2 | 3 | 15 | 28 | 2 |
| 7 | a | 3 | 1 | 15 | 25 | 6 |
| 8 | a | 3 | 2 | 15 | 24 | 5 |
| 9 | a | 3 | 3 | 15 | 24 | 5 |
| 10 | a | 4 | 1 | 15 | 19 | 4 |
| 11 | a | 4 | 2 | 15 | 19 | 4 |
| 12 | a | 4 | 3 | 15 | 15 | 3 |

*(Counter)

FIG. 7

| Table: Participant Database | | |
|---|---|---|
| Field Name | Data Type | Description |
| BIDDERID | Counter | (indexed) |
| FSTNAME | Text | First Name |
| LSTNAME | Text | Last Name |
| INIT | Text | Middle Initial |
| ADDRS1 | Text | Address 1 |
| ADDRS2 | Text | Address 2 |
| CITY | Text | City |
| STATE | Text | State |
| ZIPCD | Text | Postal Code |
| PHONE | Text | Phone Number |
| CCRD | Text | Credit Card Brand |
| CCRDN | Text | credit card number |
| EXPMO | Number | expiration month — integer |
| EXPYR | Number | expiration year — integer |
| SLIMIT | Number | self imposed limit on spending — integer |
| SETPASS | Text | password (optional) |
| CLIMIT | Number | credit card limit remaining — integer |

FIG. 8

☐ Table: Market Research Database

| Field Name | Data Type | Description | |
|---|---|---|---|
| BIDID | Number | Bid ID # | (indexed) |
| SXN | Text | Section | text |
| ARIGHTS | Number | # of rights requested | integer |
| RRIGHTS | Number | # of rights received | integer |
| ABID | Number | $ amount bid | integer |
| ORANK | Number | original rank in this section | integer |
| BMPTIME | Date/Time | time the bid was removed | Time |
| REASON | Text | bumped, canceled or replaced? | text |
| RBIDID | Number | Bid ID# of replacing bid | integer |
| BIDDERID | Number | bidder ID# | integer |

FIG. 11

(sponsor's name here)  PRESENTS ...
(performer's name here)
7pm Nov 12, AT THE ARENA Bidding in process!!

rules

SECTION C 85    66
        60
   76
                            stage ←
95    73    63    57
(high)            (low)
   79
            59
84    71

(numbers show present bid price locations)

You chose Section C.

Card number or
Password from
Registration: ▭

Number of Seats: ▭

Bid per seat: ▭
(whole dollars only)

Submit   Clear Form

To cancel a bid you
have sent, check this
box and click on
"submit" ☐

111

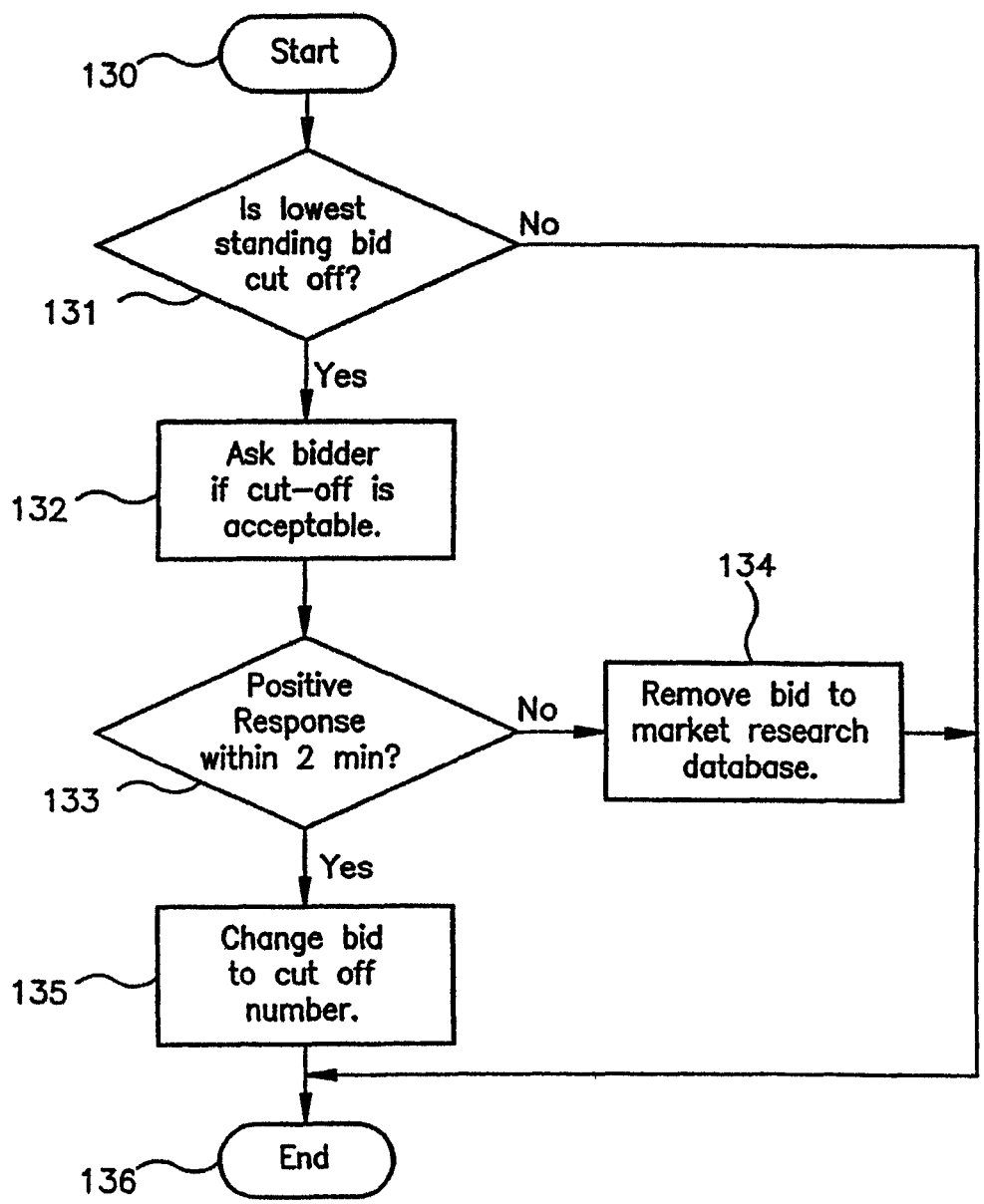

Seating Options

If I'm bumped from section B:
○ Cancel my bid for full refund.
● Bump me back to section C.

If I can't get a front row seat:
○ Cancel my bid for full refund.
○ I don't want a front row seat.
● Prefer front row but will accept others.

Aisle seat preference:
○ Must have. I will move back for it.
○ Will not accept aisle seat.
○ Prefer aisle but will accept others.
○ Do not prefer aisle.
● Don't care.

Password: ******
Number of Seats: 5
Present Bid: 80
Lock in Premiums: ___ (if any)
Total Costs: 400

Lock in my seat NOW!
If you can't wait for your seat location to be determines by the auction, you may "lock-in" your location for a premium. Over time, this premium will drop as the overall bid levels rise. At this time the premium is 50%

Proxy my bidding
Enter your present bid in the window above and choose from the following.
○ keep me in the same location for up to a cost of ___ per ticket, or bump me.
○ Keep me in the same section for up to a cost of [120] per ticket, or bump me.
○ Keep me in the bidding for up to a cost of ___ per ticket, or bump me.

*You cannot choose both 'Proxy' and 'Location.'

XYZ Band Farewell Tour July 3, 2002 . . . Anyplace Stadium    The XYZ Band Farewell Tour

*FIG. 14*

All seats are shown in the venue map (as with Sections A and B below).

Whatever seat and bid you scroll to, that seat becomes highlighted in the venue map to show the bid's seat position.

Bids Received (in dollars)

| | 8:00 a.m. | 8:30 a.m. | 9:00 a.m. | 9:30 a.m. |
|---|---|---|---|---|
| | 300 | 260 ~446 | 215 | 200 |
| | 250 ~448 | 230 | 205 | 165 |
| | 220 | 210 | 190 | 145 |
| | 190 | 205 | 180 | 130 |
| | 180 | 185 | 175 | 115 |
| | 170 | 160 | 155 | 110 |
| | 145 | 150 | 140 | 100 |
| | 125 | 140 | 125 | 90 |
| | 105 | 115 | 90 | 75 |
| | 100 | 95 | 65 | 55 |
| | 90 | 80 | | |
| | 80 | 70 | | |

442 — 300; 440 — 250

| Tee Times | Winning Bid |
|---|---|
| 8:00 | 300 |
| 8:05 | 250 |
| 8:10 | 220 |
| 8:15 | 190 |
| 8:20 | 180 |
| 8:25 | 210 |
| 8:30 | 260 |
| 8:35 | 230 |
| 8:40 | 205 |
| 8:45 | 185 |
| 8:50 | 170 |
| 8:55 | 205 |
| 9:00 | 215 |
| 9:05 | 190 |
| 9:10 | 180 |
| 9:15 | 175 |
| 9:20 | 160 |
| 9:25 | 155 |
| 9:30 | 200 |
| 9:35 | 165 |
| 9:40 | 150 |
| 9:45 | 145 |
| 9:50 | 145 |
| 9:55 | 140 |
| 10:00 | 140 |
| 10:05 | 130 |
| 10:10 | 125 |

You have selected the priority bidding option.

Please click exactly where you would most like to sit.

Red Bid (first priority bid)
# of Seats     2
Bid Amount  $250

Enter Bid

Yellow Bid
Click on your second choice location.

Red Bid (first priority bid)
# of Seats ___2___
Bid Amount __$250__

( Enter Bid )

Yellow Bid (2nd priority)
# of Seats _____
Bid Amount _____

( Enter Bid )

Figure 34
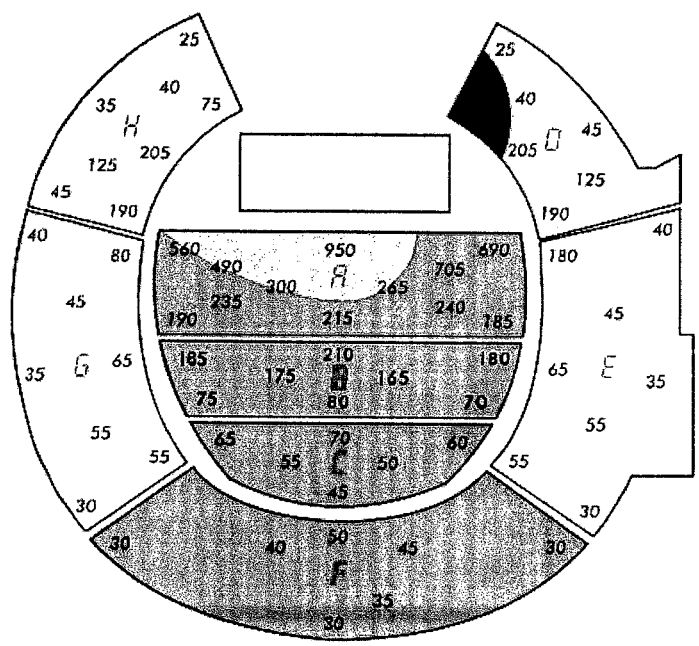
Red Bid (first priority bid)
# of Seats____2____
Bid Amount__$250__
[Enter Bid]
Yellow Bid (2nd priority)
# of Seats____4____
Bid Amount__$65__
[Enter Bid]
Green Bid (3rd priority)
# of Seats____10____
Bid Amount__$20__
[Enter Bid]

COMPUTER-BASED RIGHT DISTRIBUTION SYSTEM

CROSS-REFERENCE TO RELATED APPLICATIONS

This application is a divisional of U.S. application Ser. No. 11/453,286, filed on Jun. 14, 2006, which is a continuation of U.S. application Ser. No. 11/059,990, filed Feb. 17, 2005, which is a continuation-in-part of U.S. application Ser. No. 09/778,606, filed Feb. 7, 2001 (now U.S. Pat. No. 6,907,405), which is a continuation-in-part of U.S. application Ser. No. 09/586,927 filed Jun. 5, 2000 (now U.S. Pat. No. 6,704,713), which is a continuation of PCT application Ser. No. PCT/US00/03136 filed Feb. 7, 2000, which is a continuation-in-part of U.S. application Ser. No. 08/862,547, filed May 23, 1997 (now U.S. Pat. No. 6,023,685), which claims the benefit of provisional patent application No. 60/018,211, filed May 23, 1996. The entire disclosure of each one of these priority applications is hereby incorporated by reference herein.

BACKGROUND OF THE INVENTION

1. Field

The present invention relates to the field of auctions and, in particular, networked systems for conducting specialty auctions using computers.

2. Background

An important goal of anyone attempting to sell the right to attend an event, to own a product, or to perform an activity is to receive in return for that right the true market value of the right. For some rights, the market values of similar rights are all equal. For example, under normal conditions, the fair market value of two identical radios, both of the same brand and model, is the same. Thus, if a consumer were given the opportunity to purchase the right to obtain one of the radios instead of the other, there would typically be no incentive for the consumer to pay for that right. Therefore, the market value of the rights to obtain the radios are equal. However, the relative market values of some rights to similar products, services, or events are not the same, but are dependent upon a difference in some characteristic of the rights. For example, when purchasing tickets to a concert, although each of two tickets may allow the holder to see the same performer, on the same night, in the same venue, the market values of those tickets differ depending upon the location of the ticket within the venue. Therefore, the market value of the right to sit in a particular seat at a concert depends at least in part upon the characteristic of the proximity of the seat to center stage.

The right to perform an activity, or obtain a product, or attend an event wherein the difference between the market value of the right and the market value of another similar right is dependent upon the difference in some characteristic of the rights shall be referred to herein as a "priority right". A ticket is one example of a priority right used throughout the specification. However, it is to be understood that tickets are not the only priority rights applicable to the present invention.

Too often, the established methods of selling priority rights do not result in prices for these rights that are equal to their true market value. Therefore, these established methods are incapable of maximizing the revenue of those selling priority rights.

For some priority rights; the manner in which differences in the pertinent characteristic affect the market value of the right are apparent. For instance, for most sports or concert performances, the market value of the ticket rights, i.e., the right to sit in a particular seat at a particular event, is greater if the seat is closer to the stage. Thus, it may be relatively easy for a seller to rank the ticket rights prior to any sale of the rights. However, for other priority rights, although the characteristic that affects the market value of the right may itself be obvious, the manner in which variance in the characteristic affects the market value is not apparent. For example, when an individual wishes to purchase the right to play a round of golf at a particular course, the time that the round begins will likely affect the amount that the individual is willing to pay. The golfer may wish to be the first to tee off and would be willing to pay more for such a time than for any other. On the other hand, the golfer may have another commitment in the morning and be interested only in tee times in the afternoon. Therefore, the amount the individual would be willing to pay for a time in the afternoon varies greatly from the amount for a time in the morning. Due to this variability in consumer preference, any ranking of the rights to play a round of golf at particular times on a particular day by the owner of the golf course may not result in sales prices for these rights that are equal to their true market values. Therefore, a system is needed whereby the true market values of all priority rights can be achieved, including both those rights with relative values that can be easily pre-ranked and those rights with relative market values dependent upon consumer preferences that are difficult to discern prior to the commencement of sales.

Types of Priority Rights

As discussed above, the right to sit in a particular seat for a particular event is a priority right wherein the market value of similar rights can be ranked prior to the sale of the rights, by ordering the seats in large part according to their proximity to center stage. The current manner of selling the right to sit in a particular seat for a particular event involves selling tickets to the event. However, the established method of selling tickets to sporting and entertainment events involves pre-setting inflexible prices and then releasing the tickets for sale at a box office or by phone. This method has a number of shortcomings. Typically, each sale involves employees taking time-consuming individual orders and trying to describe the prices and seat locations to customers. Another shortcoming with this method is that it can be highly inconvenient and sometimes impossible for the purchaser to access the sale due to demand. This is especially true for premium or "high demand" events. Moreover, for practical reasons, prices are assigned to tickets in large blocks, while, in reality, purchasers often consider tickets within a block to have a wide ranging continuum of values; and these market values can be very hard to estimate before the tickets are sold. Largely because of these shortcomings, many premium tickets are sold for substantially less than their market value. Generally, these shortcomings exist even with new automated methods involving phone or Internet sales since the number of tickets is limited and the selling system is still fundamentally the same; with "first-come-first-served" orders taken for pre-priced tickets.

Another priority right with a relative market value that can be fairly easily determined prior to sale is the right to obtain a product for which the market demand far exceeds the supply. Occasionally, a manufacturer underestimates the demand for its product and thus creates too few units for the product's initial market release. Examples of this occurrence in the recent past include the Cabbage Patch Kids™ doll, the Tickle-Me Elmo™ doll, and the Sony PlayStation 2™ video game system. When such a situation exists, the manufacturer generally maintains a fixed selling price and offers the products on a "first-come-first-served" basis. The manufacturer not only loses revenue from the sales it could have made if it had produced more units, but it also loses revenue by selling the units it did produce at a price below their true market value. This difference between the original sales price and the market value is typically realized by an entity other than the manufacturer, e.g. one who buys the product and then resells it at a higher price. The pertinent characteristic that determines the market value of such highly desired products is the time of availability of the product to the consumer. In other words, a consumer would pay more to have the first product off the assembly line than to have the five-hundredth. Therefore, a system is needed so that when a manufacturer realizes that it has produced too few of a highly desired product, the manufacturer may maximize its revenue on those products by selling them at their true market value.

Other priority rights with market values that can be ranked prior to their sale are rights to obtain services wherein the value of those rights are dependent upon the order in which the services are received. For example, many consumers hire companies or individuals to remove snow from their property after an accumulation of snow. However, the value of this service is dependent upon the time at which the service is performed and, therefore, is dependent upon the order in which the properties are serviced. For instance, a consumer would likely be willing to pay more to be the first serviced after the accumulation of snow has stopped than to be the twentieth to receive the same service. Therefore, a system is needed wherein this discrepancy in market value may be realized by the provider of the service.

Another example of a service with a market value dependent upon the order of its performance is admittance through a toll booth. Currently, the administrator of a toll booth receives a set price for each vehicle that passes through the toll booth. That price is often dependent upon the type of vehicle, but the price does not reflect the true market value of the right to pass through the booth. The true market value depends upon how quickly the consumer is able to pass through the booth, i.e., the consumer's order in the line at the toll booth. Therefore, a system is required whereby the price of the right to pass through a toll booth is dependent upon the order in which the consumer is allowed to pass through the toll area.

Another right for which the current sales system does not return the true market value of the right is the right to obtain a certain numbered product of a limited edition series of products: For example, a popular artist may sell only 100 prints of one of her paintings. The current established method for such sales is offering all of the prints for sale, at a set, inflexible price on a "first-come-first-served" basis. However, this sales approach may not achieve the full market value for all of the prints. Many consumers may be willing to pay more for the first numbered print than for the fiftieth. Therefore, because only one price is set for all of the prints, many of the prints are likely being sold at a price below their true market value. Also, by basing the availability of the prints upon "first-come-first-served," the additional profit that could be gained by selling a print to one who comes later but is willing to pay more is lost. Because the lower the number on the limited edition item, the higher its value, the relative market values of the rights to obtain items with different numbers can be determined prior to any sales activity. A system is needed whereby the true market value of limited edition items may be realized by the seller of the items.

Other markets in which the priority rights that are sold are often purchased for less than their market value are those markets containing products whose true market value depends on the product's location. For example, the rights to stay in cabins on cruise ships or hotel rooms or bungalows in vacation resorts are often assigned a sales price based on the amenities available in the room. However, among rooms containing the same amenities, the true market value of the right to stay in each room may differ depending upon the distance from the room to some desired location, such as a pool, beach, or lounge. The established method for determining the price of the right to stay in such rooms is to simply set a fixed price and make the rooms available on a "first-come-first-served" basis. A system is needed whereby the market values of these priority rights, which can be ranked according to the distance from some desired attraction or attractions, can be fully realized.

Another characteristic which determines the value of some priority rights is the time of entry into some venue. The established methods for selling these priority rights are not capable of garnering the full market value of the rights. For example, theme parks, such as Disneyland™ and Busch Gardens™, sell tickets at an inflexible price for a day's admission to the park. However, the actual time of admission to the park on any particular day is generally determined by how early the patron is willing to arrive at the park to stand in line. An earlier time of admission is desired by many patrons because the most popular attractions at theme parks often fill up quickly and maintain long lines for the entire day. The desirability of early admission is evidenced by the current practice of some theme parks, such as Walt Disney World™ in Orlando, Fla., which allow customers who stay at resorts affiliated with the theme park to enter the park earlier than customers who do not. However, this practice consists of allowing all patrons of the affiliated resort to enter the park at a set time, such as one hour prior to the admittance of the general public. This practice does not maximize the profit that may be obtained by the selling of these rights. Some of those customers who stay at the affiliated resorts may be willing to pay more to enter the park before other affiliated resort patrons. Further, this system does not account for the profit that could be gained by allowing members of the general public to purchase the right to enter the park at a time prior to other members of the general public. The relative value of these rights can be easily ranked, with earlier times of admittance having higher market values.

Another priority right with a market value dependent upon location, but for which pre-ranking of the relative market values may not garner the true market value of the rights, is the right to sit at a particular table in a restaurant. A patron is likely to pay more to obtain a table closer to a window, for example, and is likely to pay less for a table close to the kitchen. However, individual patrons may prefer one window view to another or may desire to sit at a table in a corner for more privacy. Therefore, a complete, objective ranking of such rights to sit at a particular table may not be entirely accurate. There is a need for a system which would enable the seller of these rights to obtain their full market value.

As discussed above, the right to begin a round of golf at a particular time is a priority right for which the relative market values of related rights are difficult to determine prior to the sale of the rights. The tee time itself is the pertinent characteristic that determines the relative values of the rights to begin rounds of golf throughout a particular day. However, it is unclear prior to the sale of the rights which times are most desired by individuals wishing to play golf that day. The established method for determining tee times at a golf course is to set an inflexible price for playing a certain number of holes and then offering tee times on a "first come first served" basis. At premier golf courses, the system may be slightly different, requiring consumers to stay at a particular resort or be a member of an association in order to purchase a round of golf. However, even within these premier systems, the tee times are generally offered on a "first-come-first-served" basis. These systems fail to garner the most profit for the golf course owners because individuals who attempt to reserve tee times after all the times have been reserved may be willing to pay more than the owner has currently received for a particular time. Also, some individuals may prefer to tee off at certain times of the day and, therefore, would be willing to pay more for the right to tee off at those times. For example, a golfer may wish to be the first person to tee off on a particular day, or a golfer may wish to tee off later in the afternoon to avoid the heat of the day and to view the sunset on the golf course. Therefore, the current system for selling golf tee times is suboptimal because it does not account for individuals who would pay more to play at a particular time or for individuals who attempt to make reservations after all tee times have been reserved.

Another priority right with a relative value dependent upon individual consumer preference and, therefore, difficult to rank prior to a sale is the right to sit in a particular seat to view a movie in a theater. When viewing a movie, many individuals prefer to sit in the exact middle of the theater. However, others, such as those with small children, may wish to sit on an aisle, and others may prefer seats in the back of the theater. Therefore, the market value of the right to sit in a particular seat is not determined by some easy calculation, such as the distance from the center of the screen, but is dependent upon each potential movie-goer's personal preferences. The current system of selling tickets to the movie and then allowing admission on a "first-come-first-served" basis does not garner the full market value of the right to view the movie in a particular seat. Therefore, a system is needed whereby the full market value of the right to sit in a particular seat to see a particular movie at a particular time can be recognized by the theater owner.

Some priority rights are unique in that it may be relatively easy in one situation to determine the relative market, value of related rights prior to their sale while in another situation it is very difficult. One example of such a priority right is the right to view an art exhibit. For highly anticipated art exhibits, many individuals. would be willing to pay a premium for the right to be one of the first to view the exhibit. Therefore, the true market value of the right to enter the art exhibit is not being achieved by the current system of either issuing select invitations to a premiere night or simply allowing admission to ticket holders on a "first-come-first-served" basis. In this situation, the priority rights could easily be pre-ranked with the earliest time of admittance being the most valuable. Thus, a system is needed whereby the exhibit organizer may realize the full market value of the right to view such an exhibit.

However, on any day after the opening day of an art exhibit, the relative values of different times of admittance may vary more widely due to the schedules of potential viewers. For example, one individual may be willing to view the' exhibit late in the afternoon because work precludes any other time of attendance. Therefore, to that individual, the right to view the exhibit in the late afternoon is more valuable than the right to view it in the morning. The current system of selling tickets for an art exhibit does not account for this variance in market value due to individual viewers' preferences. Therefore, there is a need for a system that does yield the full market value of the rights sold.

Priority Right Auctioning System Options

In selling priority rights where the relative market values of the priority rights can be easily pre-ranked, there also exists a need for a system" that can allow the purchaser to override the pre-ranking to denote the purchaser's own personal preference. For example, although seats in the front row at a concert are widely regarded as the best seats and would be pre-ranked as the seats with the highest relative market value, an individual may wish to sit on the side of the stage to be near a particular member of the performing group. If that individual was willing to pay handsomely for the right to sit in a seat on the side, but not one in front of the stage, then the full market value of the right to sit in a seat on the side of the stage would only be captured by a system which allowed the individual to denote his own ranking of desired seats. Also, a bidder may be willing to pay a premium for the right to sit in the first few rows but not for the right to sit in all the seats in a section specified by the seller of the rights. Therefore, a system is needed whereby a bidder may personally designate one or more priority rights and then offer to pay up to a certain amount for those rights.

Additionally, when purchasing priority rights consumers often wish to designate alternative bids. For example, an individual who wished to purchase the right to sit in a seat at an event may only be interested in sitting in the first few rows if it would cost below a particular price. If that person's bid was unsuccessful for that section of priority rights, however, he may be willing to sit in one of a group of seats in another location for some lesser amount of money. The current method of selling priority rights does not accommodate this desire by the consuming public to designate individually-tailored alternative priority right bids. Therefore, there is a need for a system that satisfies this desire.

Shortcomings of Current Auctioning Systems

Logistically, auctioning of priority rights has not always been feasible due to the large quantity of unique rights and even larger quantity of buyers wishing to purchase them. A few auction systems have been developed that operate using the Internet as the communications mode. These systems have been used to auction items such as computer equipment, artwork, and special items for charity. However, these systems are not suitable for use in connection with a real-time mass auction of priority rights. With the currently operating systems, generally the items being sold are of a small quantity or individually unique. In most of the currently operating systems, the items for sale are individually listed and individually bid upon using e-mail over a period of days or weeks. While, the currently operating systems are useful for such limited purposes, they have several shortcomings.

One such shortcoming arises from the use of e-mail to place bids and to update participants of their bid status. While in theory e-mail is instantaneous, there are occasional routing delays of which the sender is often not immediately aware. In an auction of a slow, deliberate nature such as those presently operating, this is not a great concern, However, in a fast pace auction with numerous participants some bids could be lost as delayed e-mail, unbeknownst to the participant.

An additional problem with the e-mail approach is that time may elapse before the bid information is read and applied. Therefore, the participant may not get instantaneous feedback on other bids which may be taking place simultaneously. The participant often must wait for some period of time to learn if the bid is successful. If the participant has a strategy for bidding on a very desirable item, the participant must return to the auction numerous times to follow its progression.

Most currently operating systems provide some general bid status data, usually a minimal amount of information such as "current" high bid. This "current" high bid is updated by periodically reviewing the bids received, and entering the highest bid to date. Therefore, these "current" bids are not current up to the second. Moreover, if there are many of a particular item, such as event tickets or golf tee times having a continuum of values, participants need to know considerably more than the high bid information in order to make an informed bidding decision.

Currently operating systems do not provide bid status information updates independent of solicitation of the information from participants. Once the Internet auction site is accessed, the information conveyed may become outdated as it is being viewed. Again this would be quite unfavorable for fast-paced auctions. Therefore, even with auction sites which were actually being updated real-time, a participant would need to continually re-access the site in order to keep information truly updated.

One Internet auction system, "onsale" at http://www.onsale.com/attempts to overcome the e-mail auction problems by automatically updating its Internet site. However, like the other Internet auction sites, "onsale" conducts relatively slow, deliberate sales, and still relies on e-mail to transmit some of the bid information. In addition, although the "onsale" auction site is automatically updated, it does not automatically present this information to participants. As explained above, participants need to continually re-access the site in order to keep information truly updated.

U.S. Pat. No. 4,689,928 details an auction system for used cars that is capable of interactive, essentially real-time auctioning. Instead of being Internet based, this used car auctioning system is constructed with a 4-level hierarchy of computers networked to a plurality of auto dealers terminals. At each level, the bids received by the computer are processed and only select bids are transmitted to the next level. The bids are raised in increments of 3000 yen and the participants may bid via a single signal indicating a "yes" in response to the bid being raised. This system is based on the traditional auction format, and is used to sell one item or lot at a time. When a car has been auctioned, a disc is loaded by each dealer into his terminal which shows the photograph of the next car to be auctioned. Bidding is limited to a predetermined group of auto dealers. Because the structure of this system is hierarchical, i.e. not on the Internet, it is not practical for use in wide-spread auctions available to consumers. Because of the methodical nature of this system, selling a progression of single items with incremented bids, it is geared for low volume sales of items with relatively high values.

Recently tickets have been made available for purchase on the Internet, for example at http://www.ticketmaster.com and http://www.tickets.com. However, at these Internet sites, sales are of the traditional pre-set pricing, "first-come-first-served" format. Some Internet sites do offer tickets in an auction format, but only a few tickets to select events sold by individuals who have purchased the tickets and are attempting to resell them. Examples of such sites are http://www.ebay.com, http://auctions.yahoo.com, http://www.allsoldout.com, and http://www.busyrhino.com.

Considering the selling of a large number of priority rights, there are unique circumstances which present challenges not manifested in selling other types of rights. Since the values of priority rights vary widely depending upon the difference in a pertinent characteristic, it is not practical to mass the priority rights into simple generic blocks to be auctioned. Nor is it practical to list and auction each priority right individually, since this could present auction participants with a prohibitively large number of individual auctions, and no practical way to obtain contiguous priority rights. In other words, if a bidder wished to purchase the right to sit in four adjacent seats at a show or movie, and the right to sit in each seat was sold in a separate auction, it would be virtually impossible for the bidder to monitor every combination of four adjacent seats and make appropriate bids. Accordingly, there exists a need for a system which can, within a single, clear format, auction a large number of rights with a continuum of values, each at its market price. Furthermore, this system needs to apply logic in sorting bids based not only on price, but on clustering requirements to ensure that within a multiple priority right bid, the priority rights are contiguous. This would require a database configuration unlike that employed by the prior art.

Moreover, given the furious pace of sales for many premium priority rights, there exists the unique and as yet, unmet challenge of providing instant, automatic, comprehensive feedback for the status of a relatively complex arrangement of standing bids. Frequently the more popular sporting and entertainment events sell all available tickets in a matter of a few minutes. The number of tickets to these events may reach into the hundreds of thousands. A practicable auction of priority rights for such an event would require a system uniquely designed to process this large volume while presenting an updated, clear and informative view of the proceedings to all participants. It would be logical to presume that efficient conveyance of bid information for a large, complex pattern of bids would require a graphical representation of the bid standings. Although some Internet auctions employ graphical representation of objects for sale, none employ graphical representation of bid status.

Another need for on-line auction systems is a method of convincing bidders to place their bids early instead of waiting to bid at the last minute before the auction closes. As mentioned previously, on-line auctions are typically conducted over a set period of time. With these systems, bidders often wait until the last possible second before auction closing to place their bids in an attempt to block subsequent bidders from making higher bids. Such actions by bidders not only keeps the price of the auctioned item undesirably low, but sometimes results in a large quantity of bids just before auction closing which the on-line system is not capable of handling. Thus, it would be advantageous for an online auction system that provides incentives for bidders to place their bids early in the auction rather than waiting until the last minute.

In addition, ticket auction participants occasionally need to have two or more mutually exclusive ticket purchase options available to them. Ticket purchase decisions are often made based on price and availability of seats having acceptable locations. Even the number of tickets a consumer wishes to order may be dependent on price. For example, a consumer may desire two front row tickets if they are within his budget, otherwise he desires four tickets in a different location within budget, otherwise he desires ten tickets anywhere available within budget. But with auctions of pre-ranked seats, some such information cannot be known until the auction has ended, unless the auction close is phased-out from the best to the worst seats. There exists a need to make solutions available in the form of mutually exclusive, prioritized bids simultaneously entered by a consumer in a ticket auction.

In addition, not all ticket auction customers will agree with the exact seat pre-ranking assigned for an auction. For example, a race fan may prefer seats behind his favorite driver's pit stop. An older fan at an arena concert may wish to be as close as possible without being on the floor, where he assumes fans will stand during much of the show. Again, there exists a need for mutually exclusive, simultaneous prioritized bidding in order to provide this flexibility to fans.

Another shortcoming of currently established methods for selling tickets and other priority rights is their inability to reap for the priority right seller the dramatic increases in market value of priority rights immediately prior to their usage. For example, in the days immediately preceding a popular concert or movie premiere, the market value of tickets to those events typically increase dramatically as publicity increases and the public focuses on the event. However, because a large percentage of the public must plan their schedules far in advance, it is not feasible to only sell tickets to these events in the few days before the event occurs. Therefore, tickets are sold months in advance and popular events sell out before the true market value of the rights to attend the event can be determined. A system is needed that permits individuals to reserve priority rights a sufficient amount of time in advance but that also garners for the priority right seller the full market value of those rights.

A potential negative effect of a system that places primary emphasis upon the maximum amount of money an individual is willing to pay for a particular right is that less affluent members of the consuming public will be unable to procure desired priority rights. Under current established methods for selling priority rights which offer rights on a "first-come-first-served" basis, individuals of limited means may still purchase rights if they are willing to stand in line for an extended period of time. Also, a system that only seeks the highest profit margin in priority rights sales would not permit special treatment of certain bidders, such as alumni group members, company employees; or frequent purchasers. Such special treatment may be important to the public image of a priority right seller, and, thus, its long-term economic success. Therefore, there is a need for a priority right sales system that maybe modified to favor members of a selected group, such as those of limited means or company employees.

Additionally, to achieve the full market value of a group of priority rights, the administrator of a priority right sales system must be equipped with certain statistical information regarding the progress of the sale. Therefore, a system for selling priority rights should be capable of real-time statistical analysis to aid the system administrator in regulating the system to achieve optimal results.

In spite of their shortcomings, the above mentioned prior art systems are useful for their respective intended purposes. However, given their limitations, and the above noted unique circumstances for mass priority right sales, it is simply not practical or feasible to apply any of the prior art to the particular task of auctioning a large volume of priority rights.

SUMMARY OF THE INVENTION

Accordingly, an object of the present invention is to provide a computer controlled auctioning system, in which an large number of participants may have simultaneous access to bid on to the desired priority rights. The above stated needs as well as others are fulfilled by the present invention through a system constructed to sell a large number of priority rights in a very short time, each said priority right being sold for a value set by existing market forces. The system provides participants with simple, yet informative graphical standing bid information on the entire stock of priority rights available, and allows them real-time bidding interaction. This system can achieve such sales even for priority rights garnering extremely high public interest, without excluding any potential purchasers.

The present invention achieves said objectives by employing a computer controlled priority right auctioning system which receives and evaluates bid information records received from a plurality of remote terminals, said bid information records corresponding to bids for one or more priority rights.

The automated priority right auctioning system is comprised of a memory storing a plurality of previously accepted bid information records, said records each including identification information, section information, quantity information, and bid price information. The automated priority right auctioning system is further comprised of a central controlling computer operably connected to the memory and operable to receive a message including a received bid information record from one of a plurality of remote terminals through a communication system, determine a lowest minimum acceptable bid value corresponding to the received section information using the previously accepted bid information records stored in the memory, and store the received bid information record if a value represented by the received bid price information exceeds the lowest minimum acceptable bid value.

The central controlling computer is further operable to, in a like manner, receive, evaluate and store, if acceptable, subsequent bids received and to stop receiving subsequent messages after a predetermined time period.

Within the automated priority right auctioning system, each previously accepted bid information record includes rank information based on the section information and the bid price information, and the central controlling computer is further operable to assign a rank to each received bid information record based on its section information, its bid price information, and the previously accepted bid information records.

After stopping receiving subsequent messages, the central controlling computer is further operable to associate one or more particular priority rights with a previously accepted bid information record based on the rank information and the section information of each of a plurality of previously accepted bid information records.

The automated priority right auctioning system further includes a programmed graphical representation method designed to efficiently convey to auction participants useful standing bid information across a spectrum of priority rights to be auctioned, allowing current priority right bid prices to be quantified in an effective manner.

The system further includes programmed methods for ensuring contiguous grouping of priority rights within each multiple priority right bid, and for ensuring that the standing bid information is automatically updated on a real-time basis and presented as such to all auction participants; said programmed method employing HTML programming features such as the recently available MET A refresh (a client pull type browser directive) or the multipart/mixed MIME format (a server push type browser directive).

Participants may access this system from remote sites using terminals, such as personal computers, via telephone lines or other means of communication. The status of bids and their corresponding priority rights are conveyed on graphic displays which are updated on a real-time basis for all participants to view. Participants may place bids of any amount, subject to predetermined limits, and cancel, raise, or lower bids at will. In addition, participants may view their personal bid standings and the updated overall bid standings without having to continually re-access the auction site. Through the participants' remote terminals, the personal bid requests are sent to the host computer which immediately processes, and sorts the bids according to section and price. The central computer immediately updates and displays the new bid standing order. When the auction is closed, the bids become fixed and the physical transaction can occur.

The system further includes the ability for participants to limit their bids to particular types of priority rights. Additionally, the system will allow participants to lock-in their priority rights before auction closing upon the payment of a premium. Also, the system provides for proxy bidding which allows participants to automatically increase bid amounts to match subsequent higher bids. The system further includes the ability for participants to define their own personal bidding sections and to make alternative bids. Also, the system provides incentives for compelling bidders to place bids well in advance of auction closing.

In addition, it would be advantageous for the system to further include the ability for each participant to place two or more prioritized simultaneous but mutually exclusive bids in a single ticket auction.

BRIEF DESCRIPTION OF THE DRAWINGS

FIG. 5 is an exemplary representation of the main auction database storing the order of bids received.

FIG. 6 is an exemplary representation of a referring database which stores the available priority rights for sale.

FIG. 7 is an exemplary representation of a referring database which stores the participants identity and personal and payment information.

FIG. 8 is an example of the statistical record of all bid events received, for use in marketing studies and customer service.

FIG. 11 is an example of the participant's terminal screen when the desired section is chosen forbidding. The bid form is included on this screen.

FIG. 13 is a flowchart illustrating an exemplary algorithm used to match the number of available priority rights with the number of seats requested by winning bidders in a system built in accordance with the present invention.

FIG. 14 is an example of the participant's terminal screen requesting further information from the participant about participant preferences.

FIG. 21 is an illustration of an auction for the right to begin a round of golf at a particular time conducted using the automated priority right auctioning system of the current invention and the algorithm of FIG. 20.

FIG. 34 is an example of the participant's terminal screen after entering a third priority location, quantity and bid amount, and submitting a third priority bid.

DETAILED DESCRIPTION OF THE PREFERRED EMBODIMENT

A computer controlled priority right auctioning system is now described with reference to FIGS. 1-34. Although many of the Figures anticipate that the priority rights being auctioned are in the form of tickets for seats to a venue during a particular event, as described herein the priority right auctioning system may be used to auction any of a number of different types of priority rights, examples of which are provided above in the Background. Therefore, references in the Description to certain pieces of auction information, such as "groups" and "subgroups" or "sections" and "subsections", may not apply to all priority right auctions. In addition, the term "priority rights" is used throughout the Description to represent all such priority rights which may be auctioned using the system.

Figure 1:
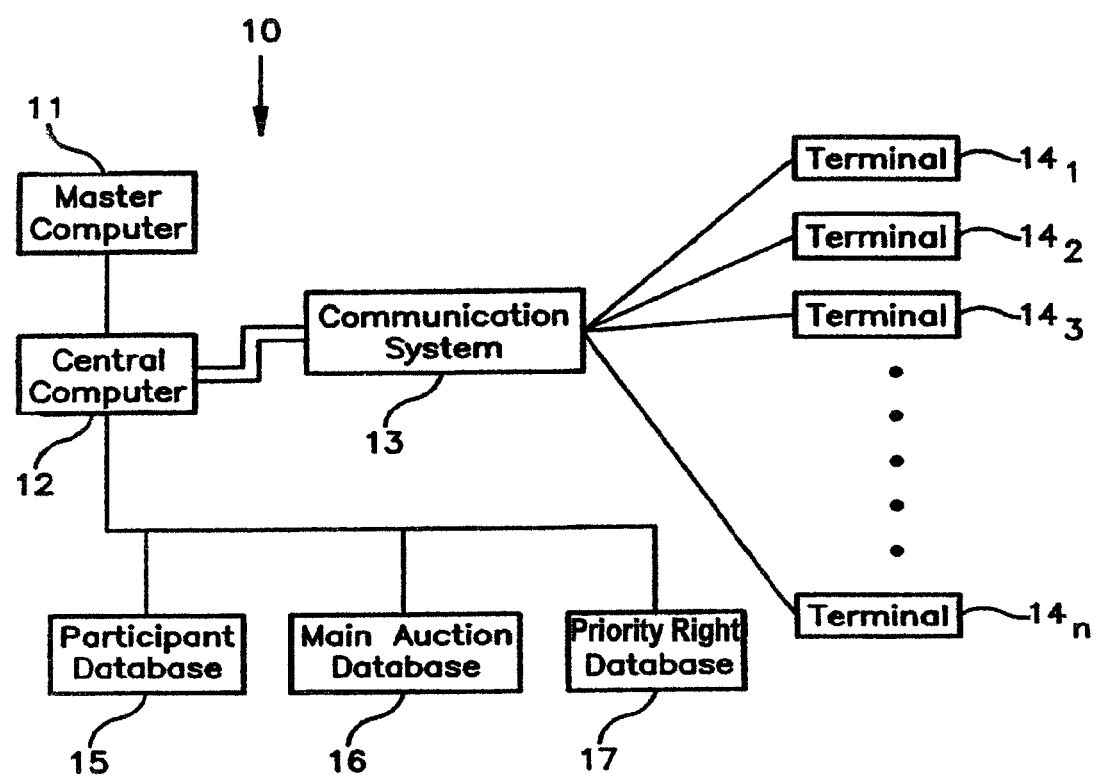
FIG. 1 is a block diagram of an exemplary system built in accordance with the present invention.

FIG. 1. shows a computer controlled ticket auctioning system 10 which is built according to the present invention. As, shown, the computer controlled ticket auctioning system 10 is comprised of a central computer 12 such as an Internet server which sends and receives information through a communication system 13 such as the public telephone system, television cable system, or satellite communications system to remote terminals $14_1, 14_2, 14_3 \ldots 14_n$, such as personal computers or other network accessing devices. In this embodiment, Internet sites are constructed consisting of web pages of graphics and text stored as html files, which present the necessary information pertaining to upcoming events and ticket sales. These sites are stored in the memory of the central computer 12. The construction and initiation of these sites is shown as step 22 and step 23 in FIG. 2, which is a flowchart illustrating the general operation of this exemplary system.

Figure 2:
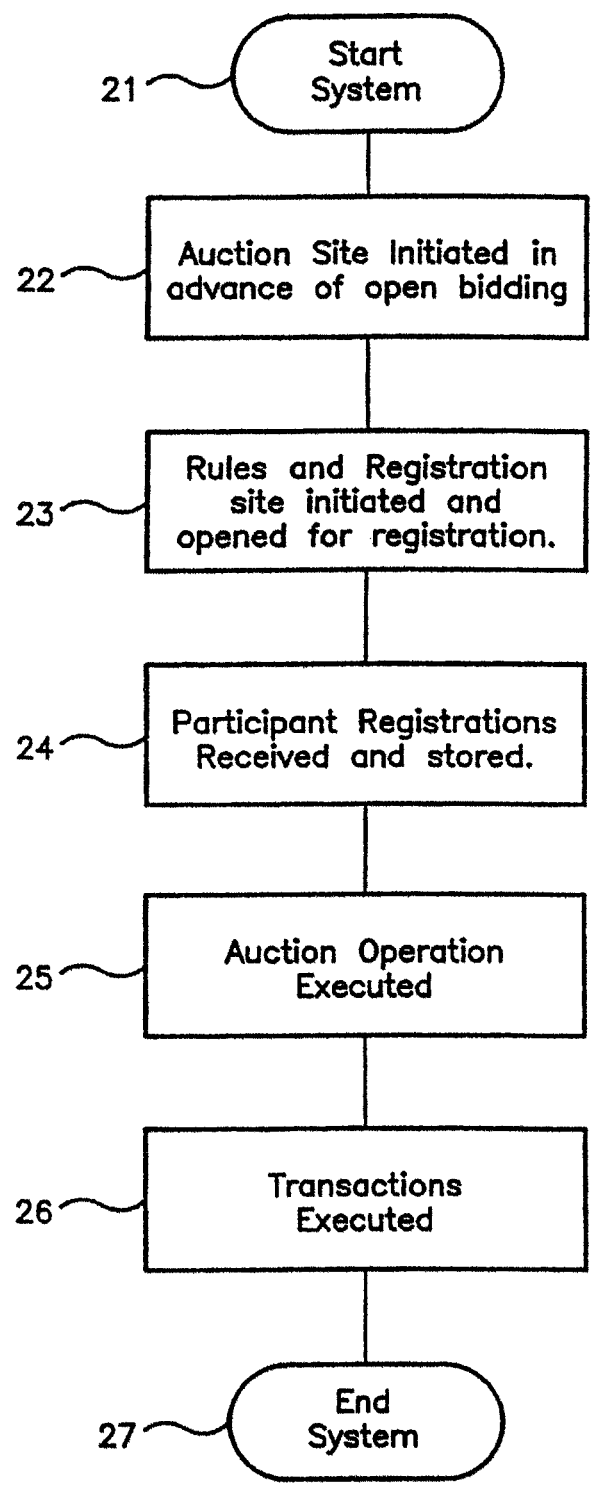
FIG. 2 is a flowchart illustrating an exemplary system built in accordance with the present invention.

Accordingly, consumers wishing to become participants (also referred to herein as "bidders") in an upcoming auction may access the central computer 12 of FIG. 1 through any remote terminal $14_1, 14_2, 14_3 \ldots 14_n$ to receive a wide variety of information about the auctions, the related events, venues, performers or teams, schedules, and merchandise; and to pre-register for the auction and payment. The registration process is represented as step 24 in FIG. 2. Next, as FIG. 2 illustrates, the auction operation 25 is executed; the transactions 26 take place, and the system is ended 27. These steps are described in more detail below.

Registration Procedure of Auctioning System

Referring again to FIG. 1, registration and bid information originating in the remote terminals $14_1, 14_2, 14_3 \ldots 14_n$, is transferred via the communication system 13 and received by the central computer 12. The central computer 12 processes said information and stores it in databases: specifically, the participant database 15 for registrations and the main auction database 16 for bids. The word database, as used herein, and in the appended claims is intended to refer to a collection of information organized in such a way that the central computer can quickly select and store desired pieces of data within the database. The information in the database may be stored in any of several ways, including, but not limited to, magnetic storage, optical storage, or any other form of storage known in the art. The central computer 12 also performs sorting and indexing operations, described below, necessary to keep the information in the databases current and correctly ordered. The central computer 12 processes and controls the information flowing between the Internet sites and the databases with programming written in the C++ programming language or any of the other computer programming languages known by one skilled in the art. Registration information may be received and stored before and during operation of the auction. The participant database, represented by FIG. 7 contains the name, address, and payment information for all participants, and is used as a referring database to the main auction database, represented by FIG. 5, during the open auction and for billing purposes when the auction is concluded. FIG. 5 and FIG. 7 are detailed below.

Referring again to FIG. 1, a master computer 11 is connected to the central computer 12• for purposes of setting up, initiating, monitoring and dismantling the auction, and its related sites or pages. For example, in preparation for an auction, numerous details specific to that auction, such as minimum initial bids, event and sponsor names, dates and times, and arrangements are generated using the master computer 11 and then transferred by disk or modem or other means to the central computer 12 when needed. The central computer 12 stores these parameters for later application to the auction process. In particular, the central computer 12 stores in the ticket database 17 a unique record for each ticket available. The auction is then conducted by the central computer 12, as described below. During the auction, the master computer 11 can be used to monitor the auction progress, make any necessary spontaneous changes to existing parameters, and to generally ensure that the auction is conducted with a minimum of problems. In practice, it may be possible to combine the functions of the central computer 12 and the master computer 11.

Figure 3:
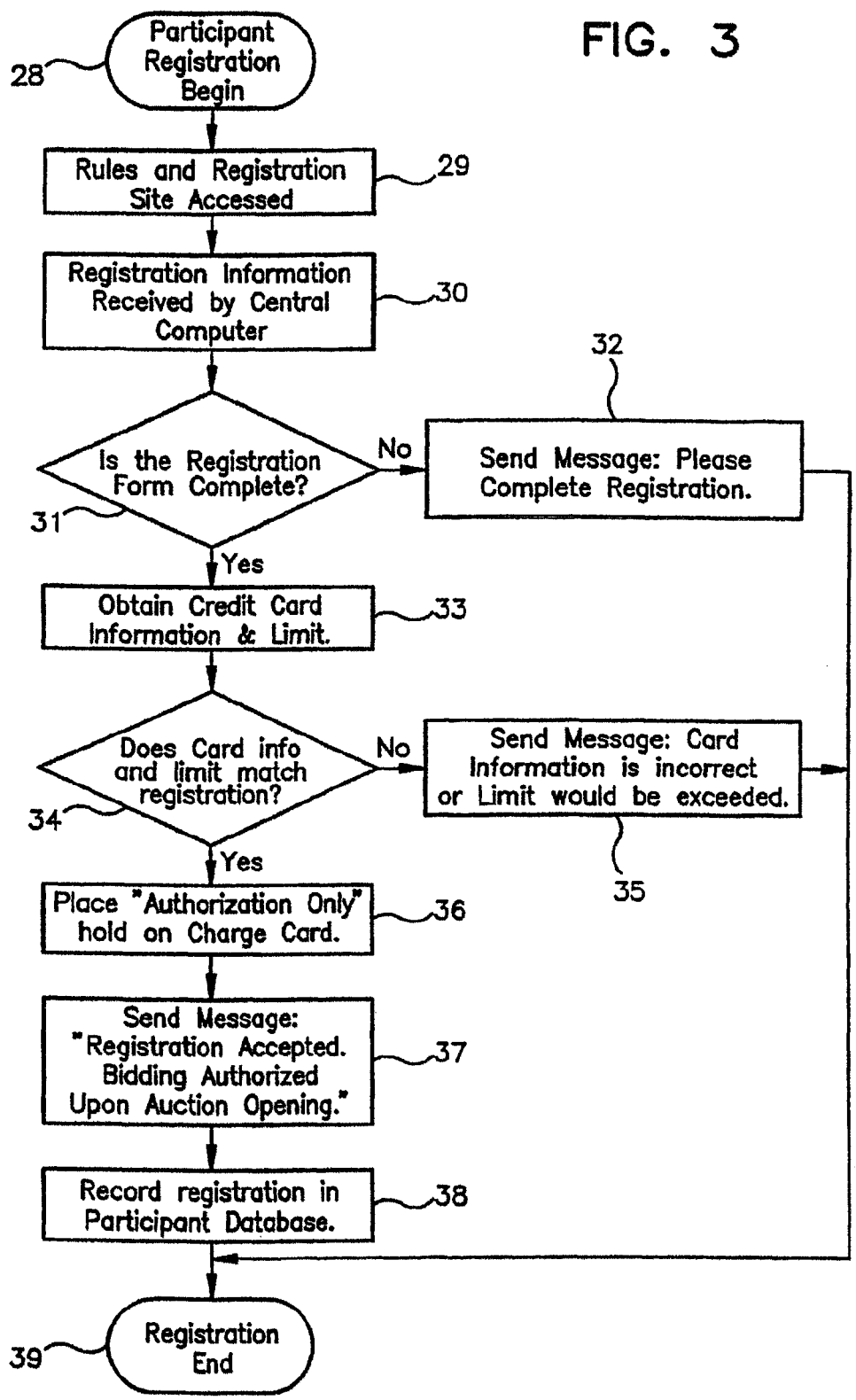
FIG. 3 is a flowchart illustrating an exemplary participant registration procedure used in a system built in accordance with the present invention.

Step 24 in FIG. 2 is illustrated in detail by FIG. 3, an exemplary participant registration flowchart. The potential registrant begins in step 28 by interfacing with one of the terminals, for example, terminal $14_1$, of FIG. 1. When the rules and registration Internet site is accessed at step 29 of FIG. 3, the registrant is encouraged to read the auction rules thoroughly, and agree to their terms. This site includes a registration form which will contain that registrant's personal information including records for the fields illustrated in the participant database of FIG. 7, as well as a checkbox for agreement to the terms of the auction rules, and a password, if desired, to protect access. The password may be chosen for use when accessing the auction, in lieu of re-entering the credit card number. This allows the participant to have an agent place bids, without disclosing the credit card number.

The central computer 12 of FIG. 1 performs all remaining steps in this registration process depicted in FIG. 3. In step 30, of FIG. 3, the registration information is received and in step 31, a determination is made as• to whether the information is satisfactorily complete. If not, a message to that effect is sent in step 32 back to the registrant, and the registration process is ended at step 39 lithe registration information is satisfactorily complete, then in step 33, the credit information is obtained through existing credit card systems for comparison to the information given by the registrant. In step 34, said comparison is performed and if the credit information does not match or the limit is exceeded, a message to that effect is sent in step 35 back to the registrant, and the registration process is ended at step 39. If in step 34 the card is determined to be valid and the limit not to be exceeded, then in step 36, an 'authorization only' hold is placed on the registrant's credit card, for an amount specified by the participant. This limit, also stored in the participant database of FIG. 7, will be that registrant/participant's maximum allowable bid during the upcoming open auction. The authorization hold verifies and reserves the payment means for the seller, while limiting unauthorized bids made by agents of the registrant/participant. Referring again to FIG. 3, in step 37, the registrant is notified that the registration was accepted and then in step 38, the records are sent to the participant database before the registration is ended in step 39.

Figure 9:
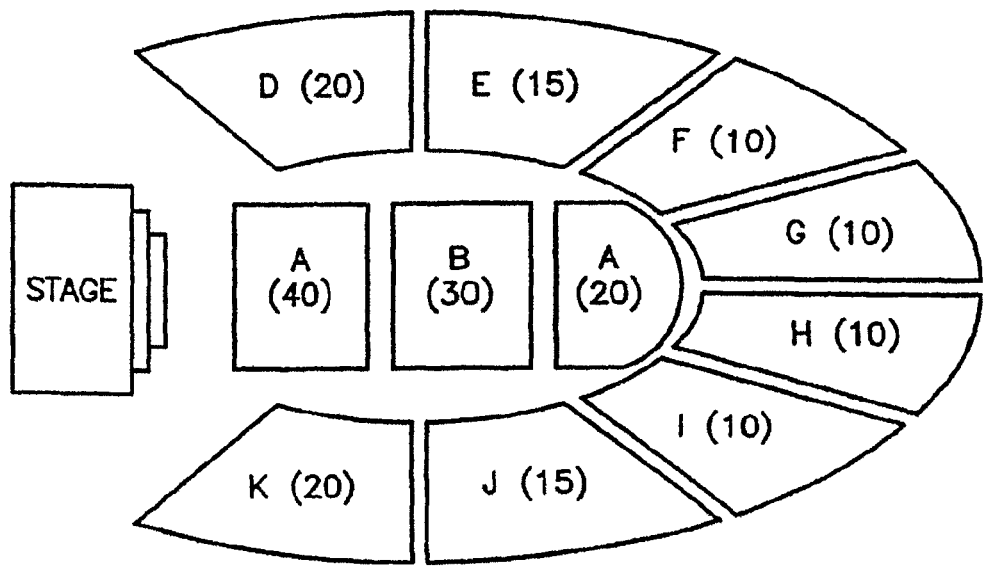
FIG. 9 is an example of the participant's terminal screen, as it might appear before the beginning of an auction. The terminal displays a graphical representation of a venue of seats, the rights to which are to be auctioned, and the preset minimum bid price of those rights.

At step 22 of FIG. 2 before the auction is opened, an Internet site is constructed and initiated to provide viewing of graphical displays of the priority right and sale information to the participants. FIG. 9 represents one such view, with initial minimum bids displayed in each section of a venue for an auction of rights to sit in particular seats at an event (i.e., "tickets"). All potential participants may access and view this site before the auction is opened. When the auction is opened, the central computer 12 of FIG. 1 activates the site to become interactive, so participants can use it to place bids on tickets. The site activation is represented as step 40 in FIG. 4 which is discussed below. When a participant places a bid, the information is received and then processed by the central computer 12 of FIG. 1 according to the flowchart outlined in FIG. 4.

Auction Procedure of Auctioning System

Figure 4:
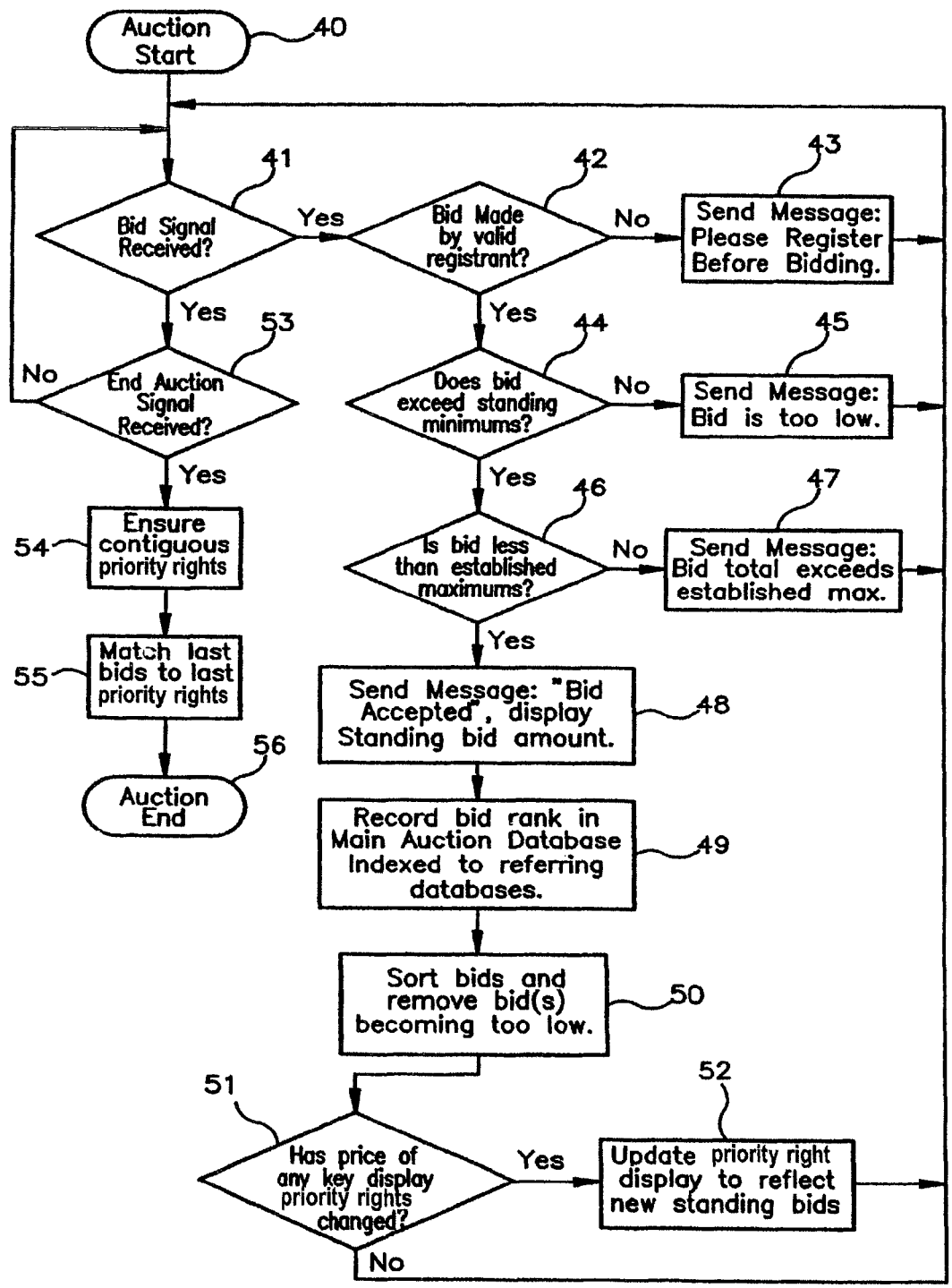
FIG. 4 is a flowchart illustrating an exemplary auction procedure used in a system built in accordance with the present invention.

FIG. 4 is a flowchart illustrating an exemplary auction procedure which is step 25 in FIG. 2. The central computer 12 of FIG. 1 performs all steps in this auction process depicted in FIG. 4. In addition, all bid information received by participants' remote terminals is generated by the central computer 12 of FIG. 1 as web-pages constructed of html programming code. The auction procedure illustrated by the flowchart in FIG. 4 is useful in auctioning all priority rights with relative market values that can be easily ranked prior to the start of the auction. This auction procedure is also capable of auctioning the rights to sit in particular seats in a movie theater if each right is sold as the right to enter the theater at a certain time and freely select from all available seats. Larger bids permit their bidders to enter the theater at earlier times to select seats. Therefore, the entrance times into the theater are easily ranked, with earlier times more valuable than later times. Other priority rights that may be auctioned using this procedure include the right to be in a particular location, e.g., a seat, during a concert, a theatrical event, a sporting event, or any other live entertainment event. The auction procedure of FIG. 4 is also, with slight modification, capable of auctioning rights with relative market values that are largely dependent upon individual consumer preference and, therefore, cannot be easily ranked prior to the sale of the rights. These modifications are described in more detail below.

Referring again to FIG. 4, in step 41 a bid information record (bid) is received as a response to a web-page form: an html programming tool commonly used to submit information from a personal computer to a server. A bid information record includes received identification information, received section information, received quantity information, and received bid price information. When a bid is received, as in step 41, then in step 42 a check is made to ensure participant's registration is on record. This is accomplished by conducting a query on the participant database 15 of FIG. 1, detailed in FIG. 7, using the received bid identification information as the query criterion. If the query finds the participant is not registered, a message to that effect is sent in step 43 back to the participant, and the bid is not recorded.

If the query finds the participant is registered, then in step 44 of FIG. 4, a check is made to ensure the participant's bid exceeds the standing minimum bid for the particular section requested. This is accomplished by conducting a query on the main auction database 16 of FIG. 1, detailed in FIG. 5, using the received section information and bid price information as the query criteria. If the query finds the bid price too low, a message to that effect is sent in step 45 back to the participant, and the bid is not recorded. If the query finds the bid price is not too low, then in step 46, a check is made to ensure the participant's bid is less than the established maximum; specifically, the amount of the 'authorization only' hold established in the participant registration and stored, for example, under the field name "SLIMIT" in the participant database of FIG. 7. Again, this is accomplished by conducting a query on the participant database using the received bid price information as the query criterion. If this maximum is exceeded, a message to that effect is sent in step 47 of FIG. 4 back to the participant, and the bid is not recorded. Upon receipt of such a message, the participant may choose to re-register in order to raise the set maximum. However, an agent of the participant would be unable to do so without the credit card information. Thus, protection is afforded by use of the password established in the participant registration and stored, for example under the field name "SETPASS" shown in the participant database of FIG. 7.

Referring again to FIG. 4, if the comparison in step 46 is positive, then the bid is accepted and displayed as in step 48. In step 49, the bid information record is recorded to the main auction database of FIG. 5 and indexed to the corresponding participant in the participant database of FIG. 7. In step 50 of FIG. 4, again using the received bid price information as the query criterion, the bid is then inserted at the appropriate rank in the ticket database of FIG. 6, described below, and indexed to the corresponding bid record in the main auction database of FIG. 5, with lower standing bids being reordered to reflect the new standings. At this step, the lowest bides) are removed from the order, (bumped), unless additional tickets are still available. Bumped bids are stored in a market research database, represented in FIG. 8, the format of which is similar to that of the main auction database. An added function of this database is to ensure that an accurate record of each bid event can be identified for customer service purposes. Next, participants whose bids become too low are notified.

Figure 10:
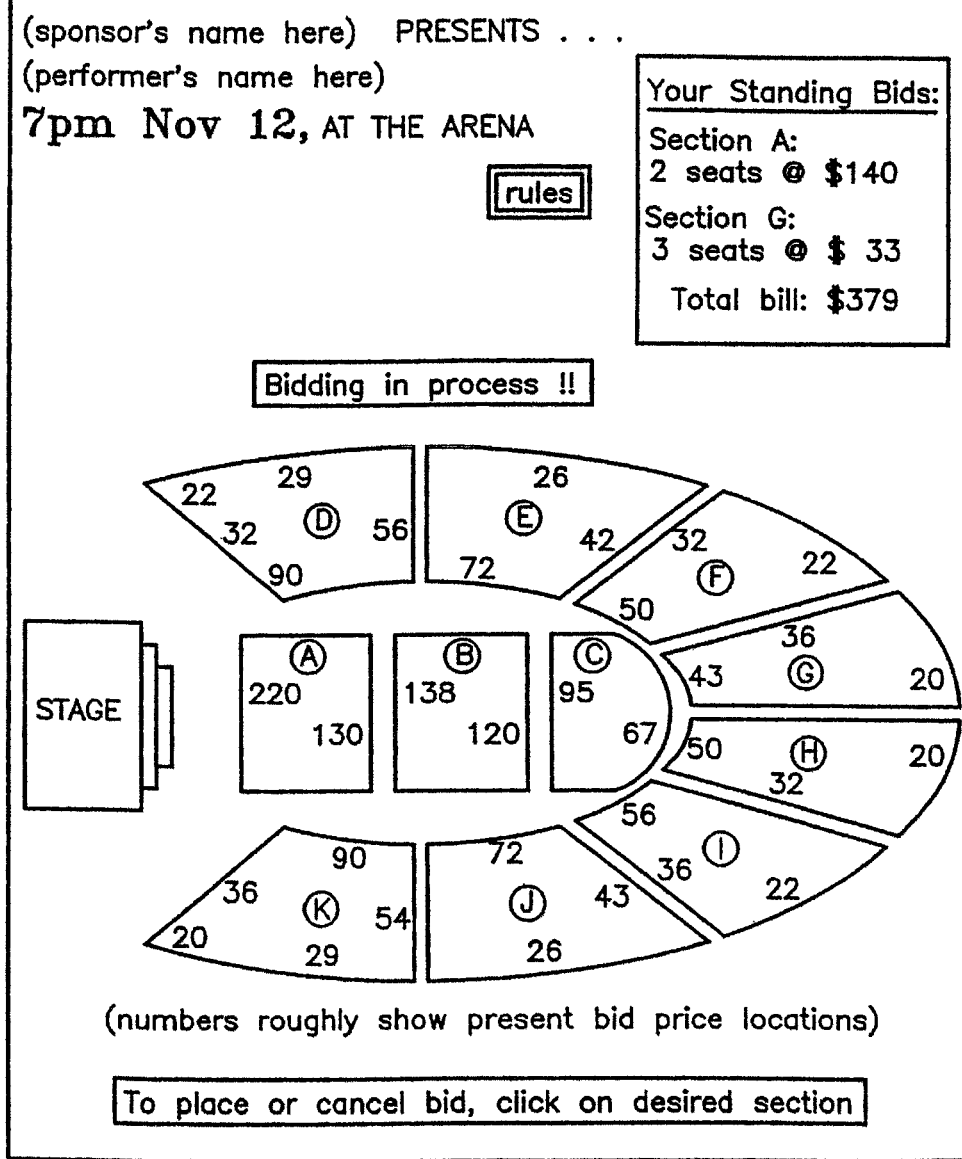
FIG. 10 is an example of the participant's terminal screen, as it might appear during an auction. The terminal displays a graphical representation of the rights to be auctioned, the present bid price of those rights, and the personal bid standing for this particular participant.

As shown in step 51 and step 52, if the standing bid price of a pre-selected key ticket in the graphical representation has changed as a result of the latest bid, this change is reflected immediately by automatically updating the display of the current bid standings. These prices are displayed within the graphical view of the priority right and sale information, just as the initial minimum bids were displayed in FIG. 9. A representation of this real-time bid status view is shown in FIG. 10. This interactive view gives participants clear, useful information sufficient to make bid decisions, regardless of the number of tickets for sale or what ticket is desired. More precise information is readily obtainable by simply clicking the mouse on the desired section of seats. This action summons the bid form along with a more precise bid status graphic such as shown in FIG. 11. The standing prices represented on these interactive sites are obtained by the central computer 12 of FIG. 1 from records stored in the ticket database 17 and inserted into the html file for display to participants. This task is step 52 of FIG. 4 and is repeated each time a change has occurred in the standing bid price of one of these key tickets. This determination is represented as step 51 of FIG. 4. These changes are automatically presented to the participants by means of META refresh, a client pull type html programming feature which directs the browser to automatically refresh the information every x seconds, where x is a variable programmed into the html file code. If no key ticket prices have changed, no further action is taken until the next bid is received or the auction is ended.

Figure 17:
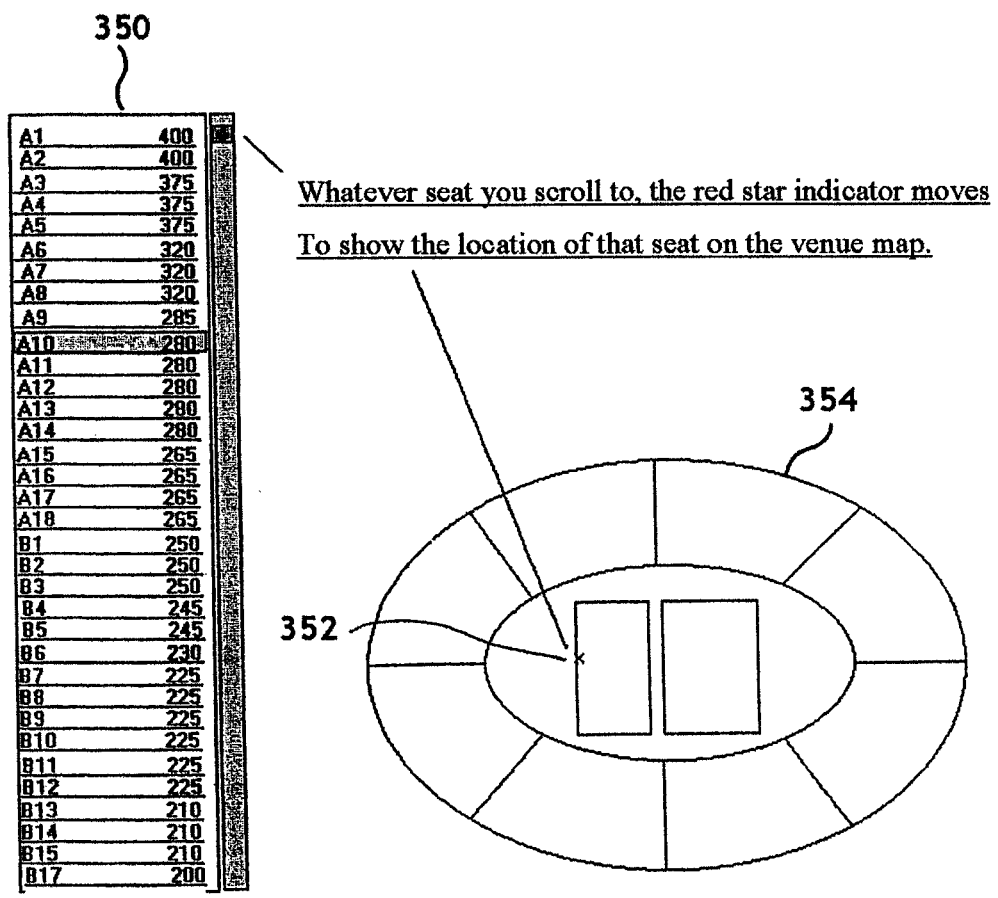
FIG. 17 is an example of the participant's terminal screen, as it might appear during an auction. The terminal displays a graphical representation of the rights to be auctioned and the present bid price of those rights.
Figure 18:
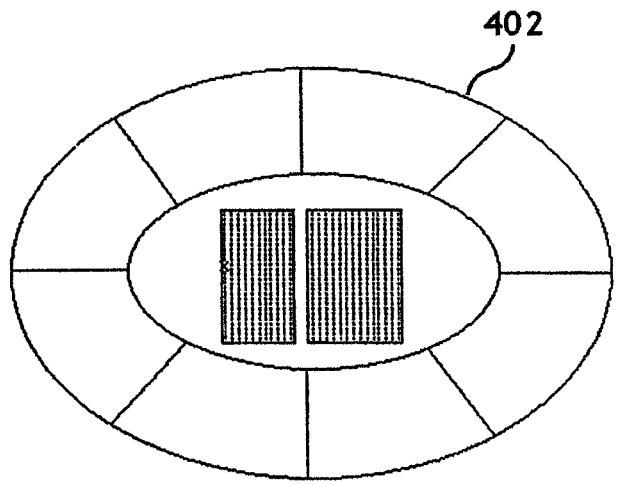
FIG. 18 is an example of the participant's terminal screen, as it might appear during an auction; the terminal displays a graphical representation of the rights to be auctioned and the present bid price of those rights.

FIG. 17 and FIG. 18 illustrate two alternative methods for displaying the current bid values for the available tickets in an auction for the right to sit in a particular seat at an event. Referring to FIG. 17, the auction participant may scroll through a list 350 of available tickets and their current standing bid values. As the participant highlights a particular seat, a red star 352 appears on the graphical representation of all available seats 354 to display the highlighted seat's location. In FIG. 18, the auction participant may also scroll through a list 400 of available seats and their current standing bid values. In the graphical representation of all available seats 402 in FIG. 18, though, all the available seats are visible at all times. As the auction participant highlights a particular seat in the list 400, the same seat is highlighted in the graphical representation 402.

Figure 12:
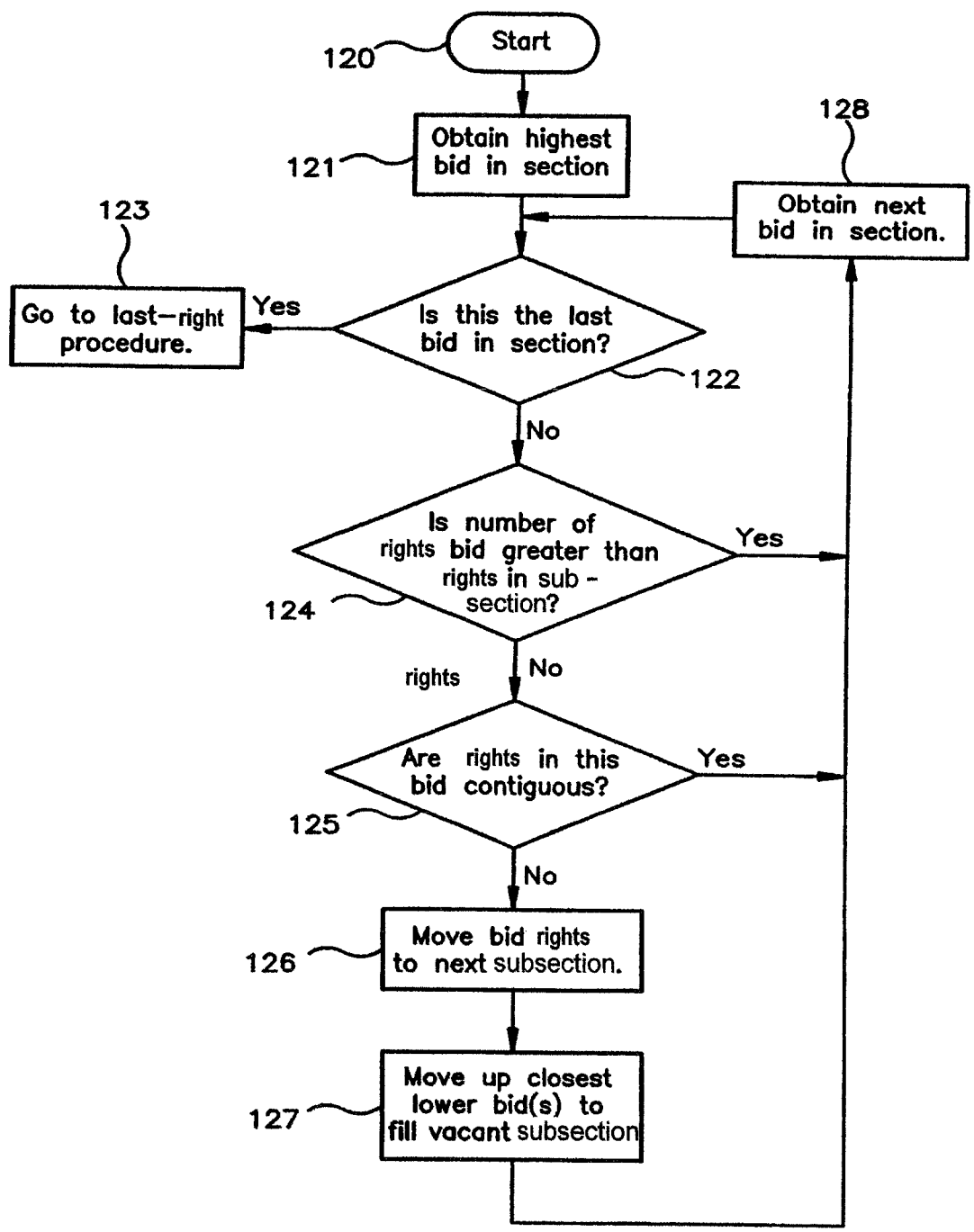
FIG. 12 is a flowchart illustrating an exemplary algorithm used to ensure contiguous priority rights within each bid in a system built in accordance with the present invention.

Referring again to FIG. 4, in step 53 the auction may be ended in response to a signal which may be sent from the master computer 11 of FIG. 1 or from an internal timer or some other predetermined means. In step 54, of FIG. 4, finalizing the ticket assignments involves application of an algorithm designed to ensure that seats within a bid are contiguous. Prior to the start of the auction, the seats may be organized into specific sections and subsections, or groups and subgroups, of rights. For example, if the rights to be sold are the rights to sit in particular seats at an event, those rights may be grouped by section number and then divided into subsections by row number. Alternatively, during the pendency of the auction, each bidder may define seat sections or subsections. FIG. 12 is an example of an algorithm that ensures contiguous seats within a bid. For each section, or group, of seats in the auction this algorithm is executed, starting with the highest bid, obtained in step 121, and working back. If the bid presently under evaluation is the last in its section, then a different algorithm is used. This determination and action is step 122 and step 123. If the bid presently under evaluation is not the last in its section, then in step 124, it is determined if the number of tickets required by the bid is more than the number available in its subsection, or subgroup. If so, it is impossible for all the seats to be contiguous, and the process begins for the next bid, in step 128. If not, in step 125 the next decision is to see if there are any breaks in the seats grouping. If not, the process begins again for the next bid, in step 128. If so, the group of seats is moved to the next subsection back, step 126, and the resulting seat vacancies are filled by moving the next lower bides) forward, step 127. In unusual circumstances, this could result in the moved group spanning two subsections again. In this exemplary algorithm, the group will not be moved again, it will remain split. When the last active bid is processed, the last-priority-right algorithm shown in FIG. 13 is applied. If the number of tickets in the bid is greater than the number of seats remaining in the section, step 131, then in step 132 the bidder is notified of the cut-off and asked it the reduced number of tickets will suffice. In step 133 and step 134 if the reply is negative or if there is no reply within 2 minutes, the bid is removed. If there is a positive reply, the number of tickets is reduced to the available amount, and the algorithm is ended.

Referring again to FIG. 2, step 26, upon auction closing, successful bidders are immediately notified at their terminals and payment is confirmed. The credit cards are debited for the appropriate amounts, and the excess amount from the' authorization only' hold is released. Proof of the bidder's ownership of the ticket is then delivered by any of a number of conventional means.

FIG. 5a and FIG. 5b represent the main auction database which stores and ranks all active bid records and pairs the associated participants and priority rights accordingly, by referencing the two referring databases. FIG. 5a is the design view of this database, defining the fields and their parameters, while FIG. 5b is the table view showing sample bid records for the first bids in a hypothetical auction. FIG. 6 depicts the ticket database, which is the other referring database. In auctions for easily ranked tickets, the ticket database of FIG. 6 contains a record of each ticket in the auction arranged in order of preference as predetermined by the promoter or ticket seller. In auctions for tickets with relative market values that are not easy to rank, the ticket database of FIG. 6 contains a record of each priority in the auction arranged in an order enabling efficient indexing of the ticket records to the bid records in the main auction database.

The databases shown in FIG. 5, FIG. 6 and FIG. 7 contain records for a hypothetical auction that is greatly simplified for illustration purposes. This hypothetical event venue contains only 12 available tickets, each defined by a record in the ticket database (FIG. 6b). As shown, minimum bids had been preset at $15 and the highest bid received was bid #1 of $30, with a quantity of 2 tickets. The first field in the ticket database, "RIGHTID" contains the unique ticket identification number which is indexed to the main auction database (FIG. 5b) by the fields "FRIGHTID" (first ticket identification number) and "LRIGHTID" (last ticket identification number). The last field is "BIDDERID", in which are stored indices referencing records in the participant database. As shown in FIG. 5b, the lowest bid was #3, requesting 2 tickets at $15. However, only one seat was reserved, since only one was available at that bid level. As detailed in FIG. 13 above, when the auction is ended, if one ticket is not satisfactory, this participant will be given the opportunity to cancel the bid.

FIG. 10 is a sample participant interface to the auction system during the open auction, represented here as a web page with graphical links to forms for placing bids on tickets to sit in particular seats for an event. As exemplified here, the participant wishing to bid, simply uses a mouse to click on the desired ticket section, calling up a bid form and a more precise view of standing bids to use as a guideline. FIG. 11 shows this more precise view for a participant who clicked on section C. The form on the right confirms this selection and prompts the participant for the specific bid information; while the diagram on the left shows that if, for instance, the bid placed is $73, then the tickets will be in the middle of section C, unless future (higher) bids push it back. Likewise, in practice it is possible, albeit tedious, to display bid prices in every subsection or even for every seat.

Accordingly, a ticket seller could promote numerous ticket sales simultaneously at one network site, with the added step for the registrant/participant of choosing the desired sale from those presented.

In one embodiment, a template may be loaded into participants' terminals prior to their accessing the auction site, said template providing text or graphic information that does not change during an auction or between auctions, such as background art, forms or instructions. Said template may be downloaded from the Internet, or installed from a disc or by some other means. Use of a template allows the bid status updates to be made with transmission of only the numerical data, which in combination with the template, presents the comprehensive auction status update to participants. In another embodiment, the bid status changes are automatically presented to the participants by means of the multipart/mixed MIME format, a recently available server-push type programming feature which takes advantage of a connection that is held open over multiple responses, allowing the server to send more data at will. This method can be more efficient, since new HTTP connections do not have to be reopened.

Participant Preference Options of Auctioning System

Various other alternative embodiments of the invention are also possible. For example, as shown in FIG. 14, after a participant places a bid, he or she is presented with participant preference options on a participant preference screen 200, which is a terminal screen that asks the participant a number of questions concerning the participant's bid. Under a priority right options block 202 on the participant preference screen 200, the participant is given the participant preference option of canceling the bid or moving back to another section if the participant is unable to secure a bid in the desired section. The system will generally default for the participant to be moved back a section unless the participant changes this option to cancel the bid in the event of a bump. Thus, if a participant has bid on tickets in Section B, but that bid is bumped, the participant will automatically be moved back to Section C upon being bumped from Section B, unless the participant instructs the system to completely cancel the bid in the event the bid is bumped.

Another participant preference option presented to the bidder under the ticket options block 202 is the option for a premium subsection ticket, such as the right to sit in a front row seat at an event. Certain bidders may be exclusively interested in a premium subsection ticket. Under this option, the participant may instruct the system to cancel the bid if the bid is bumped from the premium subsection. Thus, if a participant makes a bid and specifies that he must be in the premium subsection, the system will cancel the bid if the bid is bumped from the premium subsection. Alternatively, the participant may state that he simply prefers the premium subsection, but will take other tickets. Thus, under this option, the system will leave the participant with a premium subsection ticket so long as his bid is consistent with the other premium subsection bids. If the participant is bumped from the premium subsection, the participant's bid will not be canceled, but he will simply be moved back. This will generally be the system default. Finally, the participant may state that he absolutely does not want a premium subsection ticket, and he should be moved back if his bid lands him in the premium subsection. Thus, under this option, the system will place the participant in another subsection even if his bid qualifies him for the premium subsection.

Another example of a premium subsection ticket is the right to sit in an aisle seat at an event. The ticket options block 202 would allow the participant to specify aisle seat preference as a participant preference option. The system may present the participant with a number of choices concerning the aisle, including the following options: (i) must have an aisle seat and will move back to get on the aisle, (ii) will not accept an aisle seat, (iii) prefer the aisle, but will accept other seats, (iv) do not prefer the aisle, and (v) don't care. The "don't care" option is generally the system default. Based upon the participant's input, the system will attempt to place the participant in the desired location either on an aisle or away from an aisle.

A number of other participant preference options other than those described above may also be specified in the ticket options block 202. For example, if the priority right is the right to sit in a particular seat at an event, the system may give participants options for being placed near concession stands, restrooms, exits, or the rear of a section. Other preference options are also possible and may be easily incorporated by those of ordinary skill in the art.

The participant's preference screen 200 also includes an option 204 that allows the system to receive lock-in ticket information. This option 204 allows the participant to secure a ticket, upon payment of a premium, regardless of any subsequent bids for the ticket during the auction. This premium may be expressed in any number of ways such as a flat dollar amount (e.g., $25) or a percent of the bid value (e.g., 50%). The premium is expressed on the preferences screen 200 by lock-in premium line 208. Thus, if the participant makes a bid of $80 per ticket for five seats, and this bid currently places the bidder in a particular subsection of seats, the participant may lock-in these five tickets upon payment of the premium. If the premium is 50% of the bid value, the participant would be required to pay $120 per ticket, or $600 total dollars to secure these five seats until the close of the auction. If the participant does choose to lock-in his bid by paying the premium, the participant will retain all five tickets throughout the auction even if a subsequent bidder offers $120 or more for the same tickets.

The participant's preference screen 200 may also include an option that allows the system to receive proxy bid information. The proxy bid options are shown under proxy block 206. According to the proxy bid options, the participant may enter a maximum proxy bid amount in addition to the current bid amount. The maximum proxy bid amount is the amount that the bidder authorizes the system to bid in his absence in order to keep the bidder in the preferred seat or location. Under this block 206, the bidder has the following three options: (i) keep the bidder in the bidding for the same tickets for up to the maximum bid amount, (ii) keep the bidder in the same section of seats for up to the maximum bid amount, and (iii) keep the bidder in the bidding for any ticket in the auction for up to the maximum bid amount. Thus, if the participant bids $80 for a ticket in a certain section, but authorizes proxy bidding up to $130, the participant may leave the auction, knowing that proxy bids will be made for him up to $130 should a subsequent bid exceed his bid. If the participant chooses the option to stay in the bidding for the same ticket for up to the maximum bid, the system will keep the participant in the bidding for that ticket until subsequent bids for that ticket are received exceeding $130. At that time, the participant's bid will be bumped. If the participant chooses the option to stay in bidding for the same section of seats for up to the maximum bid, the participant will be bumped to the rear of the section as subsequent bids are received for greater than $80. Once bids for the rear of the section reach $80, the participant's bid will automatically increase to keep him in the section up to a value of $130. Once all bids in the section exceed $130, the participant's bid will be bumped. Finally, if the bidder chooses to simply stay in the overall bidding for up to $130, the participant's $80 bid will be continually bumped to less preferential tickets, as bid values exceed $80. Once the least preferential ticket reaches $80, the participant's bid will automatically increase to keep him in the bidding for up to a bid of $130. If bids for the least preferential ticket exceed $120, the participant will be completely removed from the bidding.

The participant's preference screen 200 may also include an option that allows the auction participant to individually designate those seats upon which the participant wishes to bid. Instead of selecting to bid within the sections or subsections defined by the auction organizer, each participant may define his own personal bidding section. One embodiment of this invention is to allow the auction participant to define the bounds of his personal bidding section by using a mouse to "click and drag" a cursor over a portion of the graphical representation of the available seats. Another embodiment involves permitting the auction participant to define his personal bidding section by entering the first and last seat identification numbers in the desired personal bidding section.

The participant's preference screen 200 may also include an option that allows the auction participant to place alternative bids. For example, in an auction for the right to sit in a particular seat at an event, an auction participant could designate that she wished to stay in the bidding for the right to sit in a seat in Section A for up to $50, but if that bid was bumped then she wished to stay in the bidding for the right to sit in a seat in Section D for up to $25.

This option to place alternative bids may be used with the seat sections designated by the auction organizer, as in the previous example, or with the participant's personal bidding sections. Therefore, the auction participant could designate that she wished to stay in the bidding for a right in her first personal bidding section for up to $45, and if that bid was bumped then she wished to stay in the bidding for a right within her second personal bidding section for up to $25. Additionally, more than two alternative bids may be placed.

Figure 19:
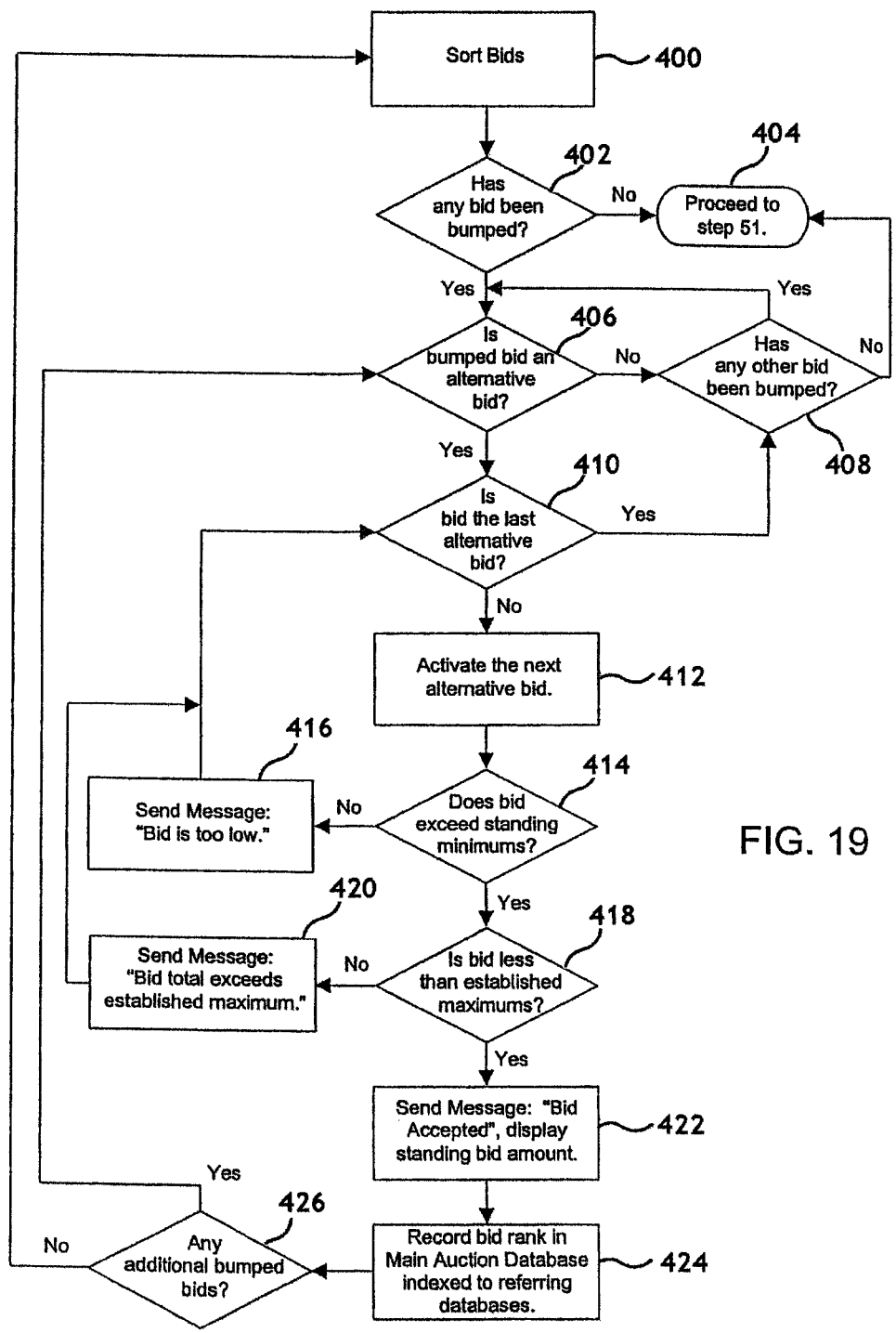
FIG. 19 is a flowchart illustrating an exemplary algorithm within step 50 of FIG. 4 for processing alternative priority right bids.

FIG. 19 is a flowchart of an exemplary algorithm that permits the tickets auction system to properly process alternative bids. This algorithm is step 50 of FIG. 4. In processing this algorithm, the automated ticket auction system processes each alternative bid as a separate bid. For example, if an individual designated a bid of $50 for rights within a first section, a first alternative bid of $30 for rights within a second section, and a second alternative bid of $20 within a third section, the system would record all three bids. However, the system would only activate the $30 bid after the $50 bid was bumped and would then activate the $20 bid only after the $30 bid was bumped.

Referring to FIG. 19, in step 400, all tickets bids are sorted. As a result of this process, some bids may be bumped. In step 402, the central computer 12 determines whether any bids have been bumped. If no bumped bids exist, the control is passed, in step 404, to step 51 of FIG. 4. If a bid has been bumped, in step 406 the central computer 12 determines whether the bumped bid is part of a series of alternative bids. If not, in step 408 it is determined whether any other bids were bumped by the sorting undertaken in step 400. If other bids were bumped, control is passed back to step 406. If no additional bids were bumped, the central computer 12 proceeds to step 404. Referring again to step 406, if the bumped bid is part of a series of alternative bids, the central computer 12 then determines, in step 410, whether the bumped bid was the last alternative bid in the series. If the bumped bid was the last alternative bid in the series, the central computer 12 proceeds to step 408. If not, the central computer 12 activates, in step 412, the next alternative bid in the bumped bid's series.

Then, in step 414 the central computer 12 determines whether the activated bid exceeds the standing minimum acceptable bid for the tickets identified in the activated bid. This is accomplished by conducting a query on the main auction database 16 of FIG. 1, detailed in FIG. 5, using the received section information and bid price information as the query criteria. If the query finds the bid price too low, a message to that effect is sent in step 416 back to the participant, and the bid is not recorded. If the query finds the bid price is not too low, then in step 418, a check is made to ensure the participant's bid is less than the established maximum; specifically, the amount of the 'authorization only' hold established in the participant registration and stored, for example, under the field name "SLIMIT" in the participant database of FIG. 7. Again, this is accomplished by conducting a query on the participant database using the received bid price information as the query criterion. If this maximum is exceeded, a message to that effect is sent in step 420 of FIG. 19 back to the participant, and the bid is not recorded. Upon receipt of such a message, the participant may choose to re-register in order to raise the set maximum. However, an agent of the participant would be unable to do so without the credit card information. Thus, protection is afforded by use of the password established in the participant registration and stored, for example under the field name "SETPASS" shown in the participant database of FIG. 7.

Referring again to FIG. 19, if the comparison in step 418 is positive, then the bid is accepted and displayed as in step 422. In step 424, the bid information record is recorded to the main auction database of FIG. 5 and indexed to the corresponding participant in the participant database of FIG. 7. In step 426, the central computer 12 determines whether any additional bids were bumped by the sorting of step 420. If so, the central computer 12 returns to step 406 so that all bids bumped by the sorting of step 420 can be examined for related alternative bids before all of the bids are re-sorted. If the comparison in step 426 is negative, the central computer 12 returns to step 420 to re-sort all of the ticket bids with the inclusion of the newly accepted bid. This algorithm is only one of various available means to enable the proper processing of alternative bids by the ticket auctioning system of this invention.

Alternative Embodiments of Auctioning System

Figure 15:
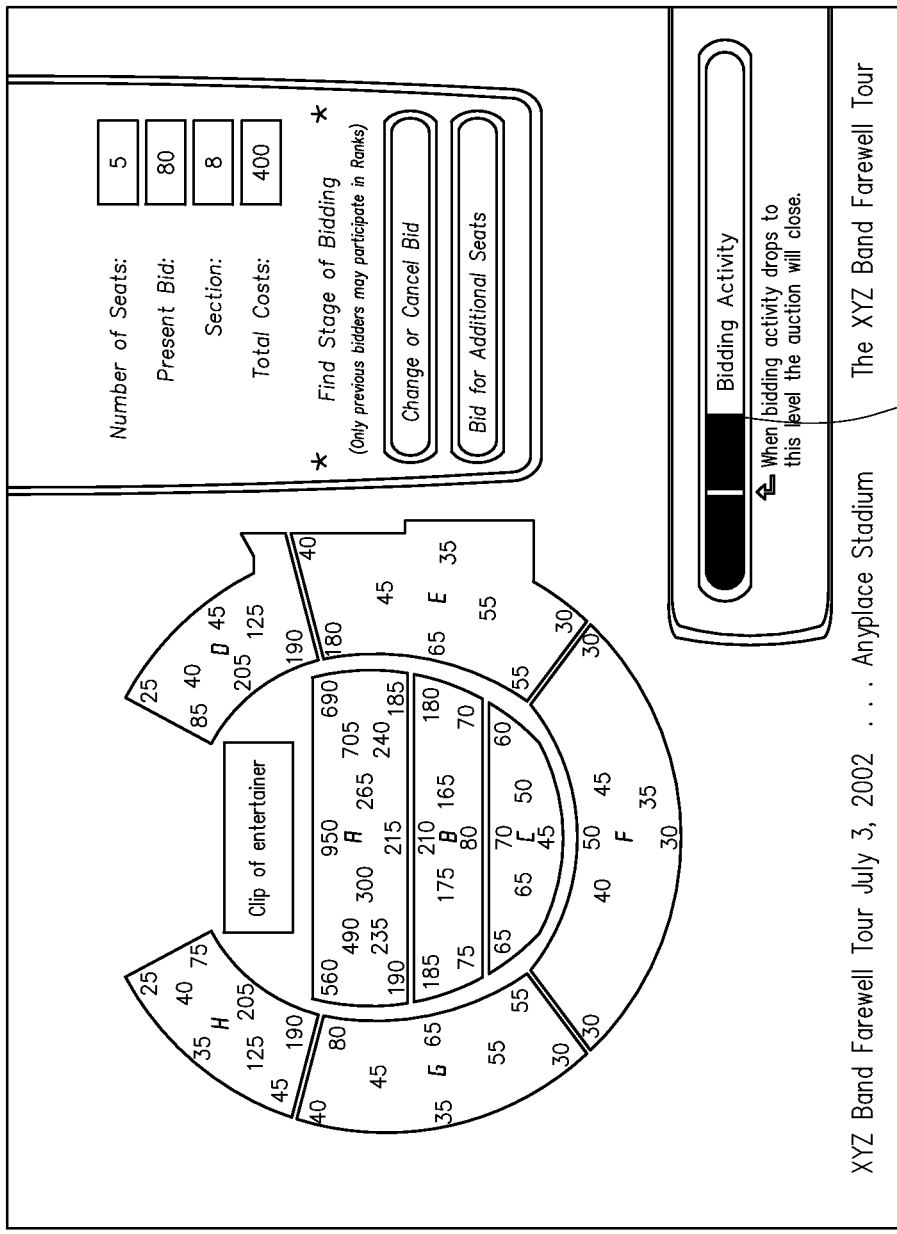
FIG. 15 is an example of the participant's terminal screen showing a bidding activity meter during open bidding.
Figure 16:
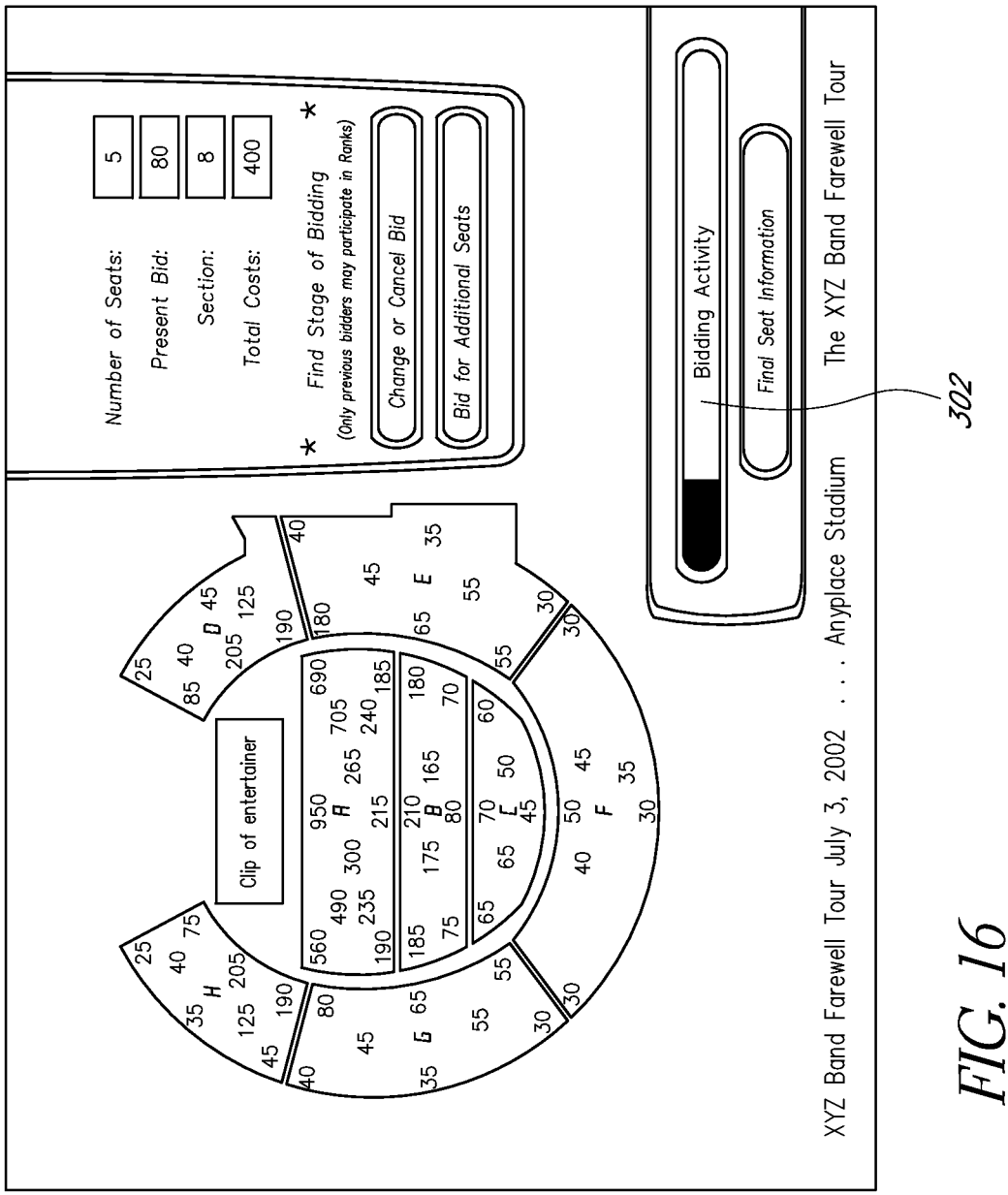
FIG. 16 is an example of the participant's terminal screen showing the bidding activity meter of FIG. 15 after bidding is closed.

In another alternative embodiment of the invention, a bidding activity meter 302 is used as shown in FIG. 15. The bidding activity meter shows a graphical representation of the rate of bidding on tickets (e.g., bids per hour or total bid revenue increase per minute). The meter shows a number of different bidding rates from left to right across the meter. A bar extends from the left side of the meter toward the right side of the meter to represent the current bidding rate. In this manner the participant can see the current rate of bids placed for tickets. The bidding activity meter allows the system to have an adjustable bidding window based upon bidding activity. The adjustable bidding window may be defined as an adjustable period of time that may be immediately terminated upon the bidding rate reaching a predefined low threshold. For example, the system may set up an auction for tickets starting at 10 a.m. on a particular day. The auction may be set up to accept bids for at least five hours, until 3 p.m., but for no more than fourteen hours, until 12 p.m. Bidding will remain open after 3 p.m., so long as the bidding continues above the predetermined threshold (e.g., 1000 bids per hour). However, if the bidding drops below that threshold, the auction will be closed immediately. Thus, the auction will definitely accept bids from 10 a.m. until 3 p.m. If the total bidding from 3 p.m. to 4 p.m. exceeds the threshold rate, the bidding will remain open. However, if at any time before 12 p.m., the bidding rate drops below the threshold, the bidding will immediately cease. Thus, if the threshold is 1000 bids per hour and the total bidding during the hours of 9 p.m. and 10 p.m. drops to 900 bids, the auction will close, and no further bids will be taken.

Because the auction may be conducted over an adjustable time period using the bidding activity meter, the bidding activity meter encourages bidders to place their bids early and not wait until the very last minute before auction closing to place their bids. When a large number of bidders wait to bid at the very last minute before auction closing, the system may be unable to handle the large number of bids and all bidders may not be allowed to place their bids. If all bids are not placed, the market price per ticket is not realized. However, the bidding activity meter prevents this problem by encouraging bidders to place their bids early. With the bidding activity meter 302, bidders will monitor the bidding activity meter and place their bids immediately when they realize that bidding is reaching the low threshold level. Because bidders will likely have a continuum of different interpretations as to when the bidding activity meter is reaching the low threshold level, bids will be more evenly distributed over time and the intensity of the final bidding will be decreased.

In a further embodiment of the invention, bidding may be split into a first session and a second session. In this first session, bids are taken to determine which bidders will receive the tickets. In this session, a market price is determined for the least preferential ticket in the auction. Alternatively, bidders may bid on the least preferential ticket in each section. Bidders making bids in excess of the market price are guaranteed a ticket and allowed to bid in the second session. In the second session of bidding, bidders place bids on particular tickets in the auction. The most preferential tickets in the auction are awarded to the highest bidders, consistent with the method of conducting an auction described herein. The bid activity meter 302 may be used in. both the first and second session of bidding to define the time limits that bidders have to place bids during the first or second sessions.

Figure 28:
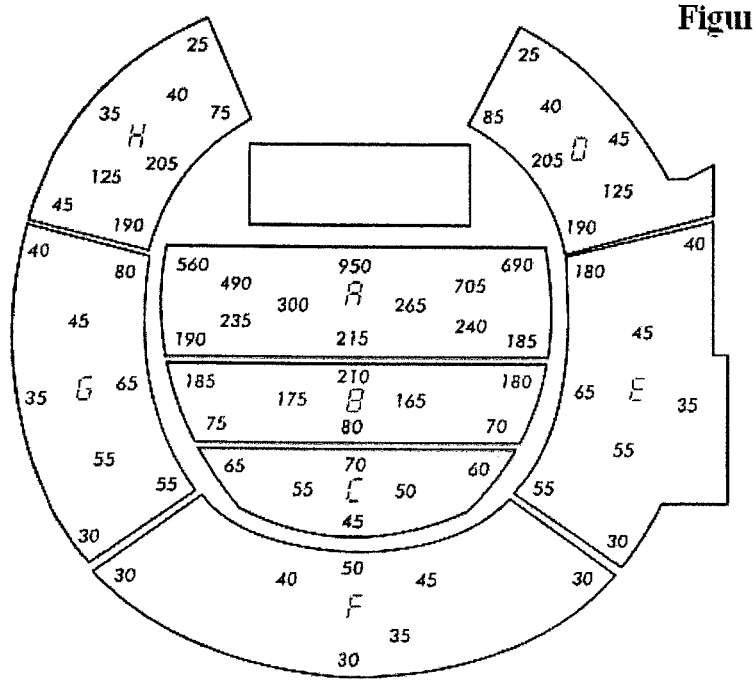
FIG. 28 is an example of the participant's terminal screen after selection of a priority bidding option.
Figure 29:
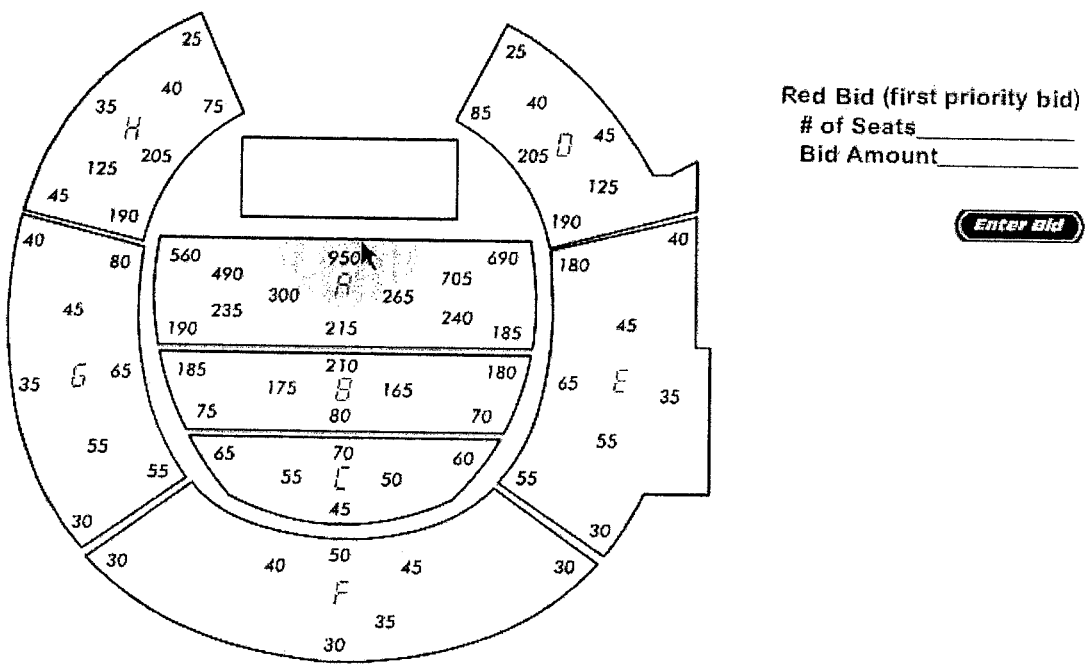
FIG. 29 is an example of the participant's terminal screen upon selecting a first priority location.
Figure 30:
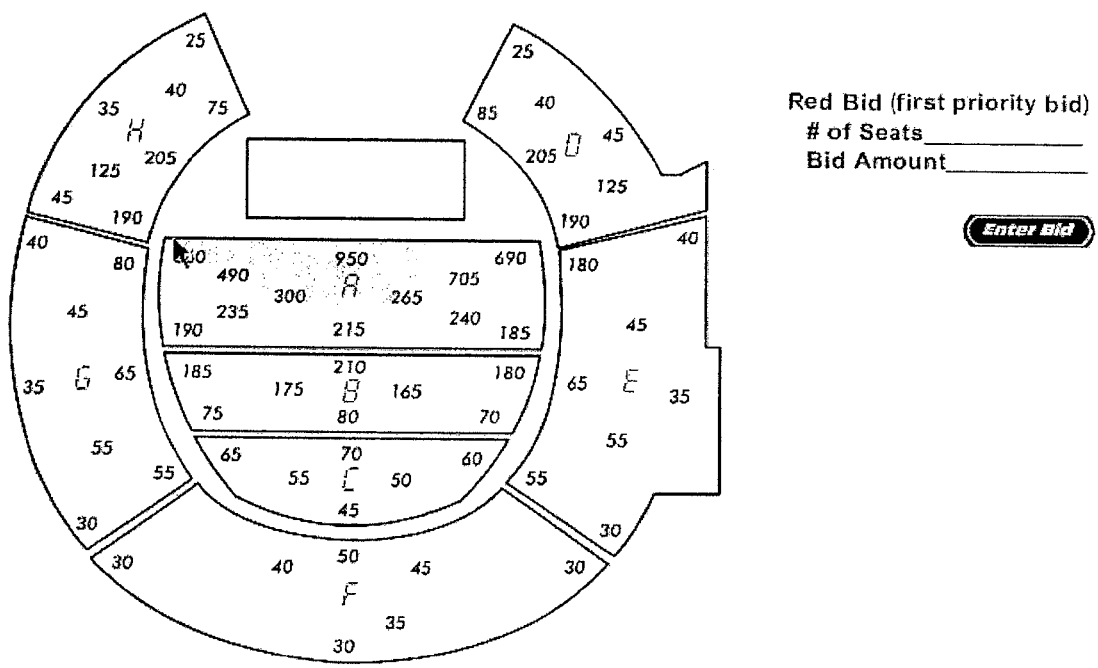
FIG. 30 is an example of the participant's terminal screen after click-and-drag adjustment of a first priority boundary area.

In yet another embodiment of the invention, priority bidding may be offered. In the ticket auction context, priority bidding allows the bid participant to place a prioritized bid that acts as a packet of bids and includes a first bid as well as at least one back up bid in the event that the first bid or other higher priority bid in the prioritized bid is rejected during the auction. By way of example, FIG. 28 shows the participant's terminal screen 400 after selection of the priority bidding option. The participant first selects and clicks a location on the venue map, which generates a colored area defining the area boundaries of this first priority bid. FIG. 29 shows the participant terminal screen 402 at this point. The first priority bid area may then be adjusted by the participant by clicking and dragging the boundaries, as shown in FIG. 30, terminal screen 404. In this example, the participant's first priority bid is for tickets to seats near the stage in the first section, but does not include tickets on the right side or toward the rear of the front section. Next, the participant enters the desired number of seats and bid amount he wishes to place, and submits the bid.

Figure 31:
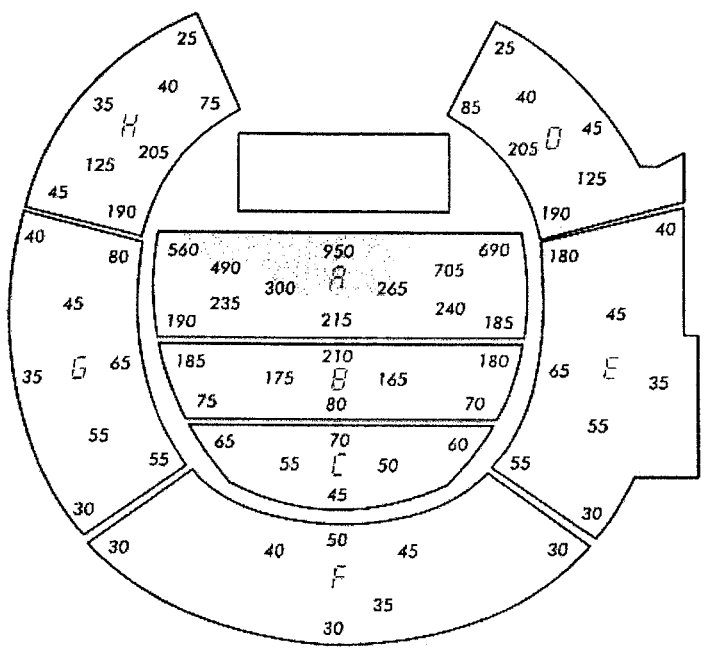
FIG. 31 is an example of the participant's terminal screen after entering a first priority quantity and bid amount, and submitting a first priority bid.
Figure 32:
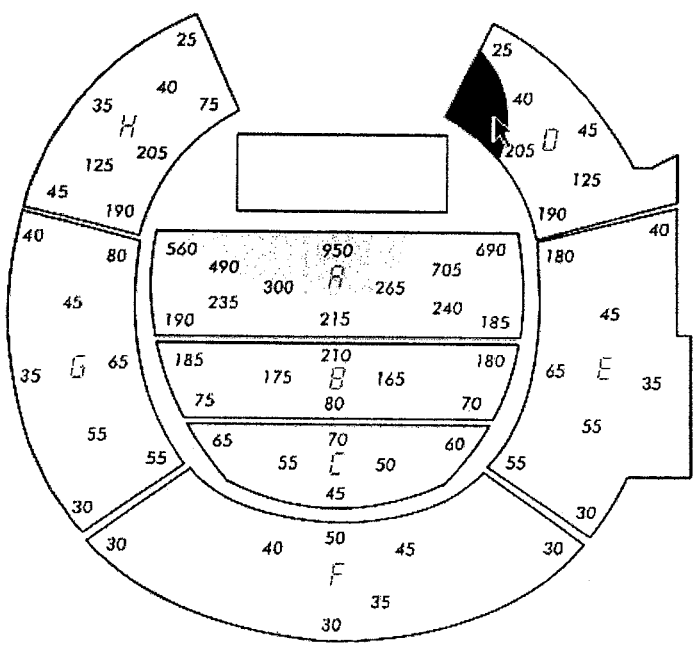
FIG. 32 is an example of the participant's terminal screen upon selecting a second priority location.
Figure 33:
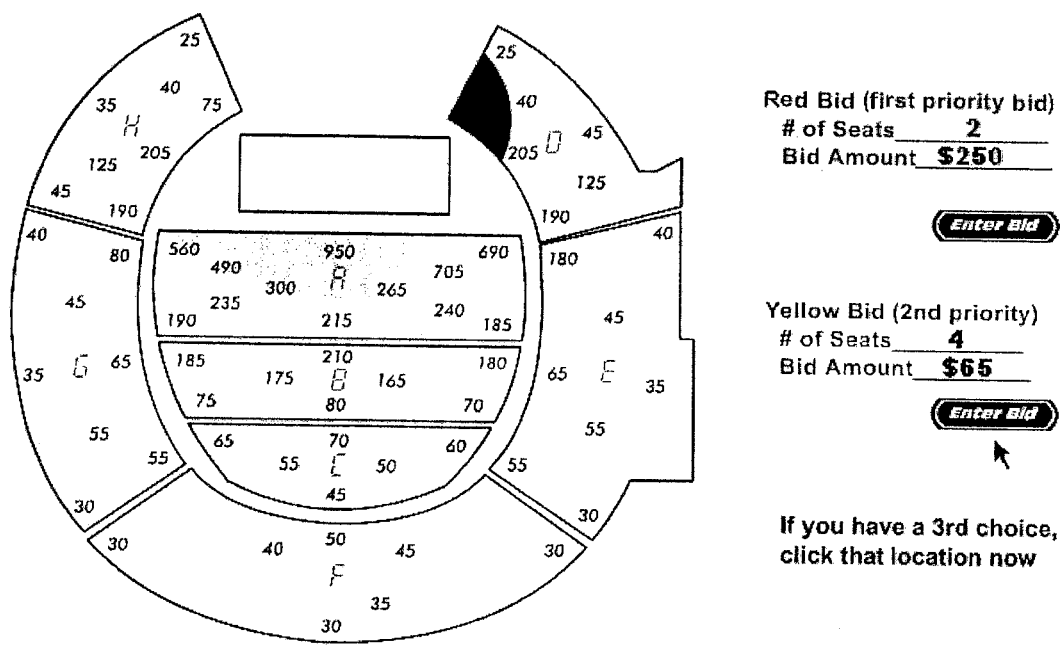
FIG. 33 is an example of the participant's terminal screen after entering a second priority quantity and bid amount, and submitting a second priority bid.

After submission of the first priority bit, a terminal screen such as screen 406 in FIG. 31 is shown that allows the participant to enter a second priority bid. As shown in FIG. 31, the participant is prompted to enter a second priority bid location, number of seats desired and bid amount, and is allowed to adjust the second bid location area according to his or her wishes. FIG. 32 shows the participant terminal screen 408 after the participant has entered the second priority bid location, but has yet to enter the information about the number of desired seats and the bid amount. FIG. 33 shows the participant terminal screen 408 after the participant has entered quantity and bid amount information and submitted the second priority bid.

After submission of the second priority bid, the participant may choose to enter a third priority bid or any number of priority bids. Entering third or additional priority bids is performed in generally the same manner as described above for the first and second priority bids. Right clicking with the mouse selects an entire section for the area of a bid, as shown in FIG. 34 with participant terminal screen 410.

When the first priority bid of a prioritized bid has been entered by the bid participant, it becomes active immediately, and is either accepted or rejected by the system. When the lower priority bids are entered, they remain inactive unless other bidders bump the first priority bid out such that the bid is no longer acceptable within its defined area. If the first priority bid is bumped or otherwise rejected during the auction, the second priority bid is then activated. If the second priority bid is bumped, the third is activated and so on. If all priority bids are bumped, the participant must raise one or more bids or enter a new bid in order to purchase tickets.

As mentioned above, the auction procedure illustrated by the flowchart in FIG. 4 may be modified to permit auctioning of priority rights with relative market values that are difficult to rank prior to their sale. In the auction of a group of such priority rights, two consecutive priority rights may have widely different market values due to individual consumer preference. For example, the value of the right to begin a round of golf at 9:00 a.m. may be significantly greater than the value of the right to begin a round of golf at 9:15 a.m. if an individual consumer's schedule dictates that he must begin at 9:00 a.m. Therefore, instead of classifying such priority rights into sections and subsections and determining the amount of an acceptable minimum bid by viewing the lowest bid in a particular section, the minimum acceptable bid for each priority right must be evaluated individually as a bid is placed upon the priority right. The auction procedure illustrated by the flowchart in FIG. 4 will satisfy this requirement if each priority right is treated as its own section in the bidding process and some modification is made to the central computer's sorting algorithm.

Figure 20:
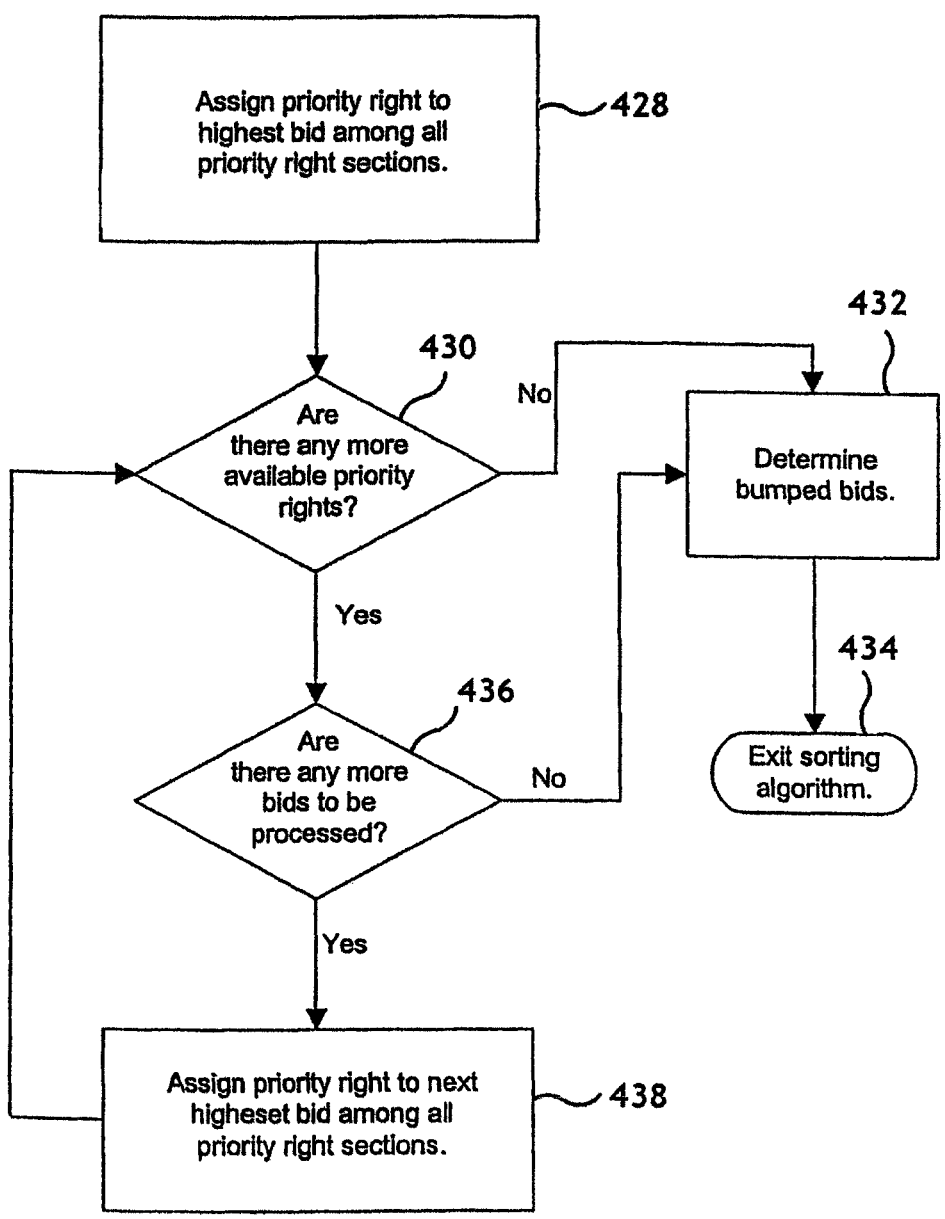
FIG. 20 is a flowchart illustrating an exemplary algorithm for sorting unranked priority rights.

In an auction for priority rights that are not easily pre-ranked, the sorting algorithm of step 50 in FIG. 4 and step 400 of FIG. 19 is slightly modified. One exemplary algorithm that illustrates this modification is shown in FIG. 20. In step 428, the central computer 12 performs a search over the entire spectrum of received priority right bids to determine the highest bid among all the priority right sections. This search may be performed expeditiously if in step 49 of FIG. 4 the bid rank of each received bid is determined relative to all other bids received in the auction. Therefore, in the main auction database of FIG. 5, the "RANK" field of the highest overall bid received in the auction would contain a "1", the "RANK" field of the second highest overall bid received in the auction would contain a "2", and so on.

Referring again to FIG. 20, in step 428, after the central computer 12 has determined which bid is the highest, the priority right designated in that bid's bid information record is assigned to that bid. This process is completed by indexing the corresponding bid record in the main auction database of FIG. 5 to the corresponding priority right record in the priority right database of FIG. 6. In step 430, the central computer 12 determines whether any priority rights are still available for auction. If the answer is negative, the central computer 12 determines if any bids have been bumped, step 432, and then exits the sorting algorithm, step 434. If any priority rights are still available for auction, the central computer 12 determines whether any bids have yet to be processed in step 436. If not, the algorithm proceeds to step 432. If there are remaining bids to be processed, the central computer 12 conducts another query to determine which bid is the next highest overall bid, step 438. The central computer 12 then assigns to that bid the priority right designated in that bid's bid information record. If the priority right designated in that bid information record has already been assigned to a higher bid, then the available priority right that is the closest to the designated priority right is assigned. After assigning a priority right to the bid, the algorithm returns to step 430. The process is continued until all available priority rights have been assigned or until all bids have been processed, whichever occurs first. The algorithm illustrated in FIG. 20 is simply one of various algorithms that permit the priority right auctioning system of the present invention to sort unranked priority rights so as to obtain for those rights their true market value.

FIG. 21 illustrates an auction for the right to begin a round of golf at a particular time that is conducted using the automated priority right auctioning system of the current invention with the sorting algorithm of FIG. 20. Frame 440 in FIG. 21 contains the bids received during the auction. In this auction, participants were permitted to designate one of four golf tee times: 8:00 a.m., 8:30 a.m., 9:00 a.m., and 9:30 a.m. The central computer 12 then utilized the sorting algorithm in FIG. 20 to assign twenty-seven available tee times to the highest of these bids.

First, the central computer 12, in step 428, determined that priority right bid 442 for $300 was the highest of all the bids received. Therefore, that bid was assigned the priority right to tee off at 8:00 a.m., and the bid record corresponding to bid 442 in the main auction database of FIG. 5 was indexed to the priority right record corresponding to the 8:00 a.m. tee-off time in the priority right database of FIG. 6. The result of this assignment can be seen in frame 444 of FIG. 21.

The central computer 12 then determined that there were more available priority rights, step 430, and that there remained bids that had not yet been processed, step 436. Therefore, the central computer 12 queried the main auction database of FIG. 5 to determine that priority right bid 446 for $260 was the highest unprocessed bid. The central computer 12 thus assigned the priority right to tee off at 8:30 a.m. and indexed the bid record corresponding to bid 446 in the main auction database of FIG. 5 to the priority right record corresponding to the 8:30 a.m. tee-off time in the priority right database of FIG. 6. The result of this assignment can be seen in frame 444 of FIG. 21.

Returning to step 430 in FIG. 20, the central computer 12 determined that there were more priority rights available and, in step 436, that more unprocessed bids existed. So, in step 438, the central computer 12 queried the main auction database of FIG. 5 to discover that the highest unprocessed bid was bid 448 for $250. However, because bid 448 designated 8:00 a.m. as its desired priority right and bid 442 had already been assigned the 8:00 a.m. priority right, the central computer 12 assigned to bid 448 the available priority right closest to the 8:00 a.m. priority right, the 8:05 a.m. priority right. The central computer 12 then indexed the bid record corresponding to bid 448 in the main auction database of FIG. 5 to the priority right record corresponding to the 8:05 a.m. tee-off time in the priority right database of FIG. 6. The result of this assignment can be seen in frame 444 of FIG. 21.

The central computer 12 continued processing this algorithm until all priority rights were assigned to received bids. The final result of all priority right assignments can be seen in frame 444. During the process of assigning priority rights, if a desired priority right was already assigned the central computer 12 then selected the closest available priority right to the desired priority right. Other embodiments of this invention may vary this selection, opting to only choose priority rights in one direction, e.g. later tee times. Additionally, the priority rights auctioning system could be modified to permit, as discussed above, alternative priority right bids, personal priority right bidding sections; and participant preference options, such as the option to designate which direction the bid is bumped. The priority rights auctioning system of the present invention, utilizing a sorting algorithm such as that illustrated in FIG. 20, is thus capable of obtaining the true market value of priority rights that have relative values that are difficult to rank prior to their sale.

Statistical Analysis of Auctioning System

Figure 22:
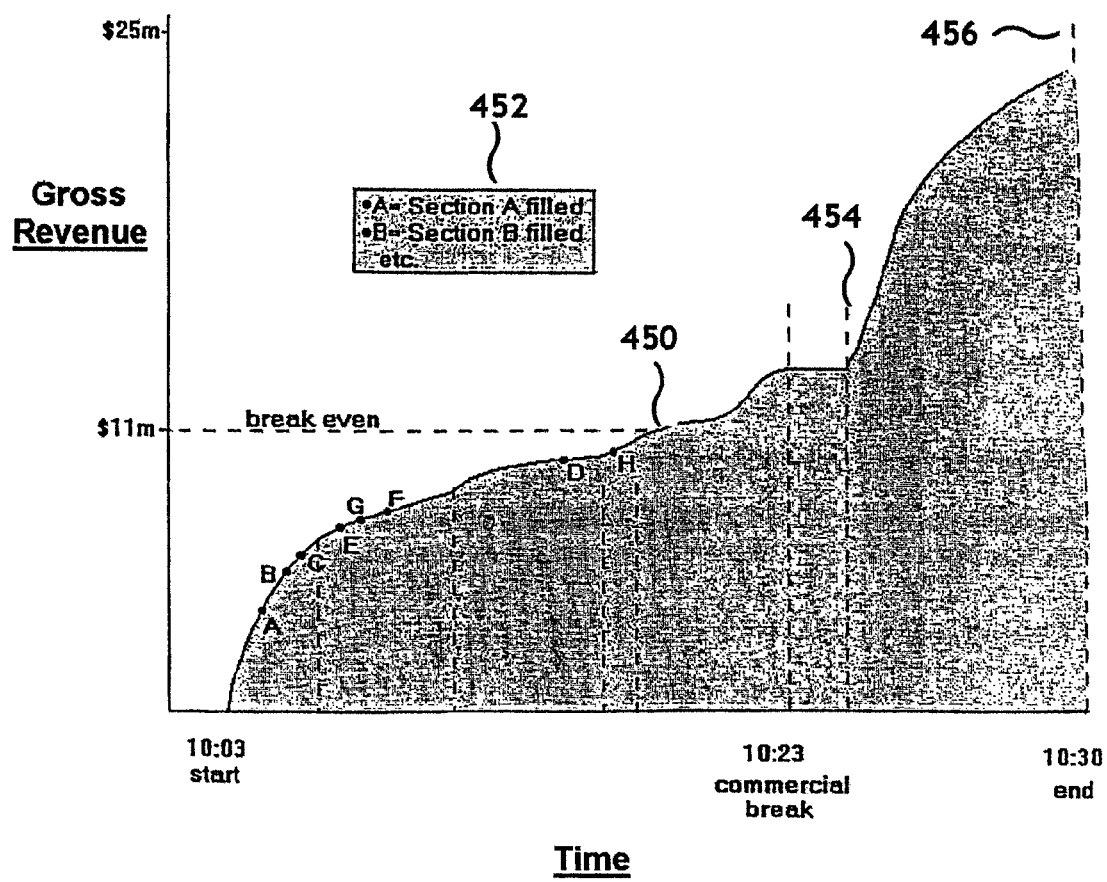
FIG. 22 is a graph of the gross revenue of an automated priority right auction versus the time over which the auction took place.

The automated priority right auctioning system of the present invention may be used in connection with other computer programs to create graphs and tables to enable real-time statistical analysis of the auction. FIG. 22 through FIG. 27 are examples of such, graphs and tables for a ticket auction. FIG. 22 is a graph of the gross revenue of the auction versus the time over which the auction takes place. It displays the dollar amount that the auction organizer must obtain to break even, eleven million dollars in this example, and the time at which the gross revenue reaches that amount 450. A legend 452 is included in FIG. 22 which denotes that each of the points on the graph labeled A through H shows the gross revenue at the exact time, that a section was filled. The section of the graph labeled II, i.e. between dotted line 454 and dotted line 456, displays how the rate of increase of the gross revenue decreases as the auction nears its end.

Figure 23:
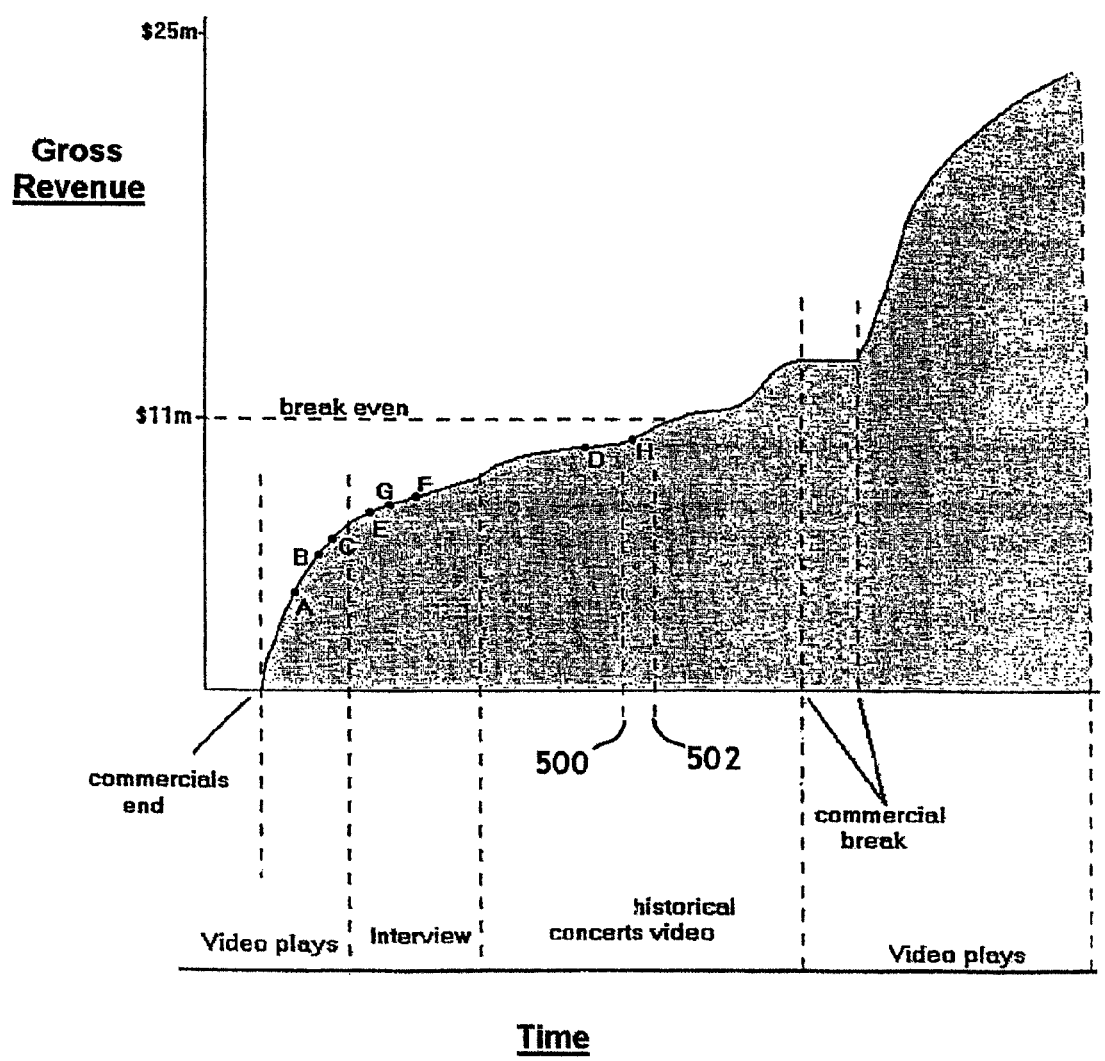
FIG. 23 is a graph of the gross revenue of an automated priority right auction versus the time over which the auction took place denoting the duration and effect of various events on the gross revenue.

FIG. 23 is also a graph of the gross revenue of the auction versus the time over which the auction takes place. FIG. 23 denotes the duration of multimedia presentations on the Internet website affiliated with the auction and their effect on the gross revenue. Other information may also be placed on the graph. For example, dotted line 500 may denote the time at which ticket lock-ins become available, and dotted line 502 may denote the time at which a promotional commercial airs on a local radio station.

Figure 24:
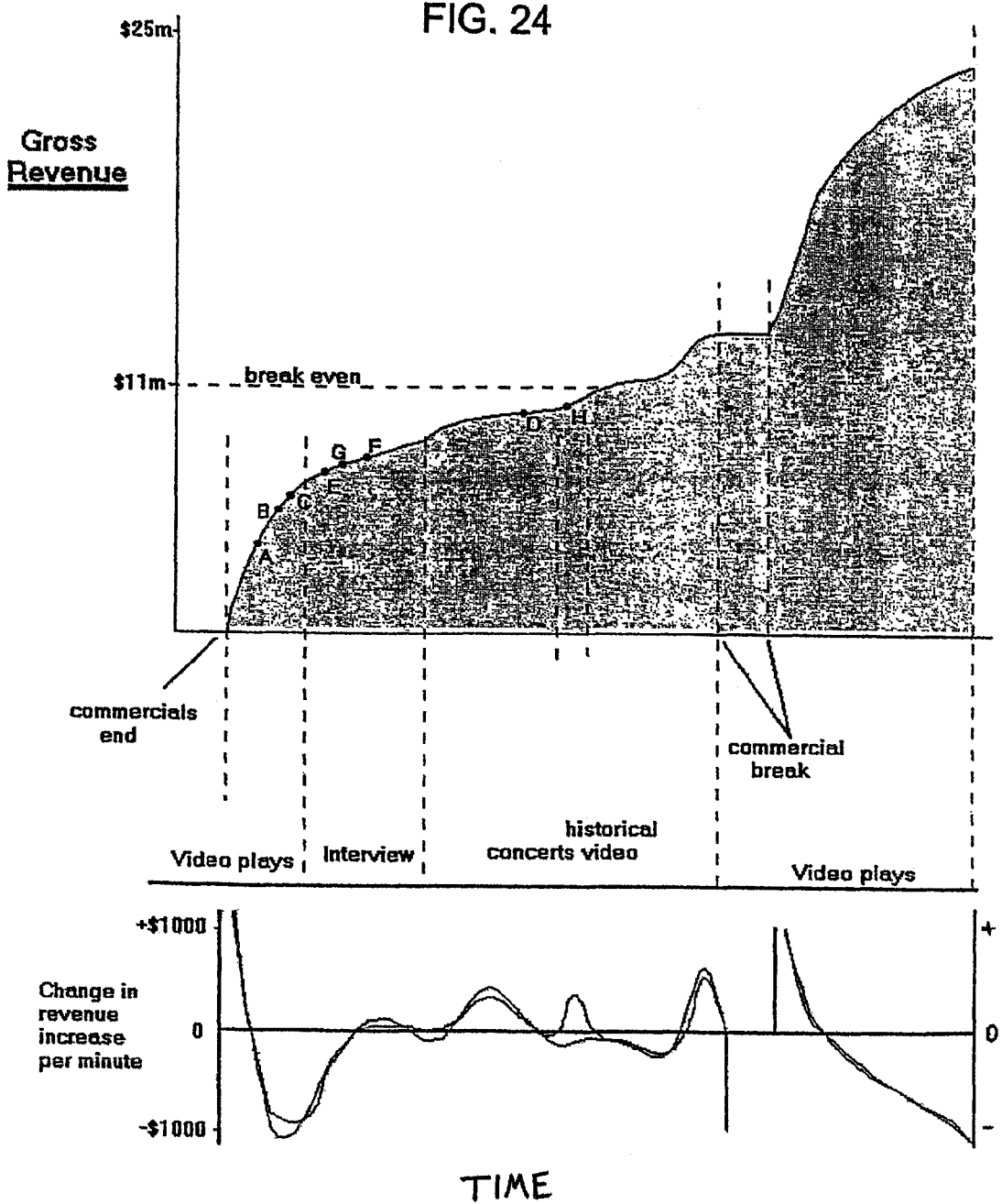
FIG. 24 is the graph of FIG. 22 and a graph displaying the change in the rate of growth of the gross revenue of an automated priority right auction per minute of the auction.

FIG. 24 is the graph of FIG. 22 with an additional graph 550 below it displaying the change in the rate of growth of the gross revenue per minute of the auction. Thus, the auction organizer can assess not only the effect of each promotional activity upon the total gross revenue but also its effect on the rate of growth of the revenue.

Figure 25:
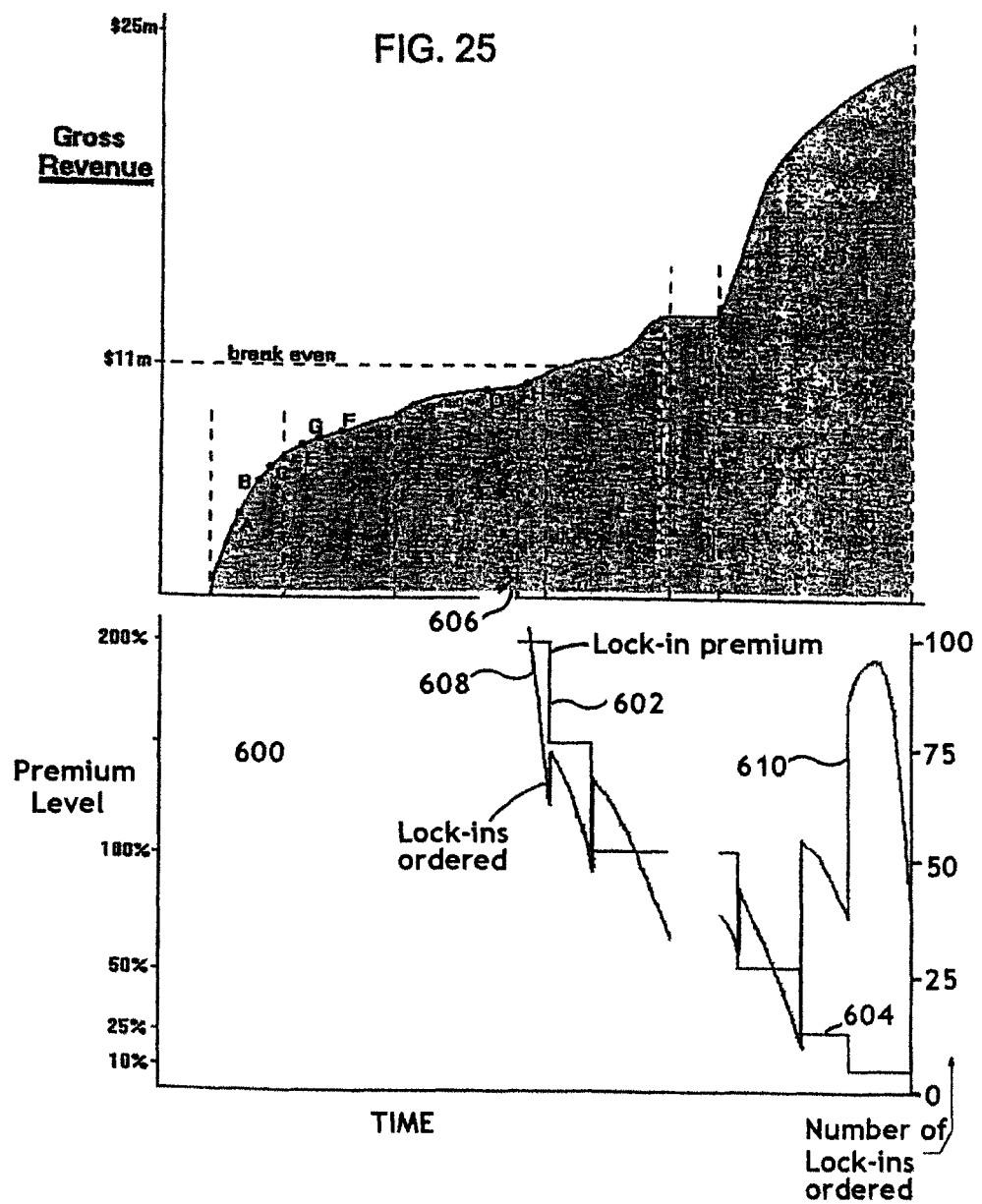
FIG. 25 is the graph of FIG. 22 and a graph of the number of priority right lock-ins ordered and the amount of the priority right lock-in premium versus the time over which the auction took place.

FIG. 25 is the graph of FIG. 22 with an additional graph 600 below it of the number of lock-ins ordered and the amount of the lock-in premium versus the time over which the auction takes place. Lines 602 and 604 in FIG. 25 display the changes in the level of the lock-in premiums over the term of the auction. Prior to the time denoted by dotted line 606 in FIG. 25, no lock-in premiums were available. Lines 608 and 610 display the number of lock-ins ordered at different times during the auction. FIG. 25 is useful to an auction organizer because it enables the organizer to analyze the effect of the timing and magnitude of the changes to the lock-in premium on the number of lock-ins ordered.

Figure 26:
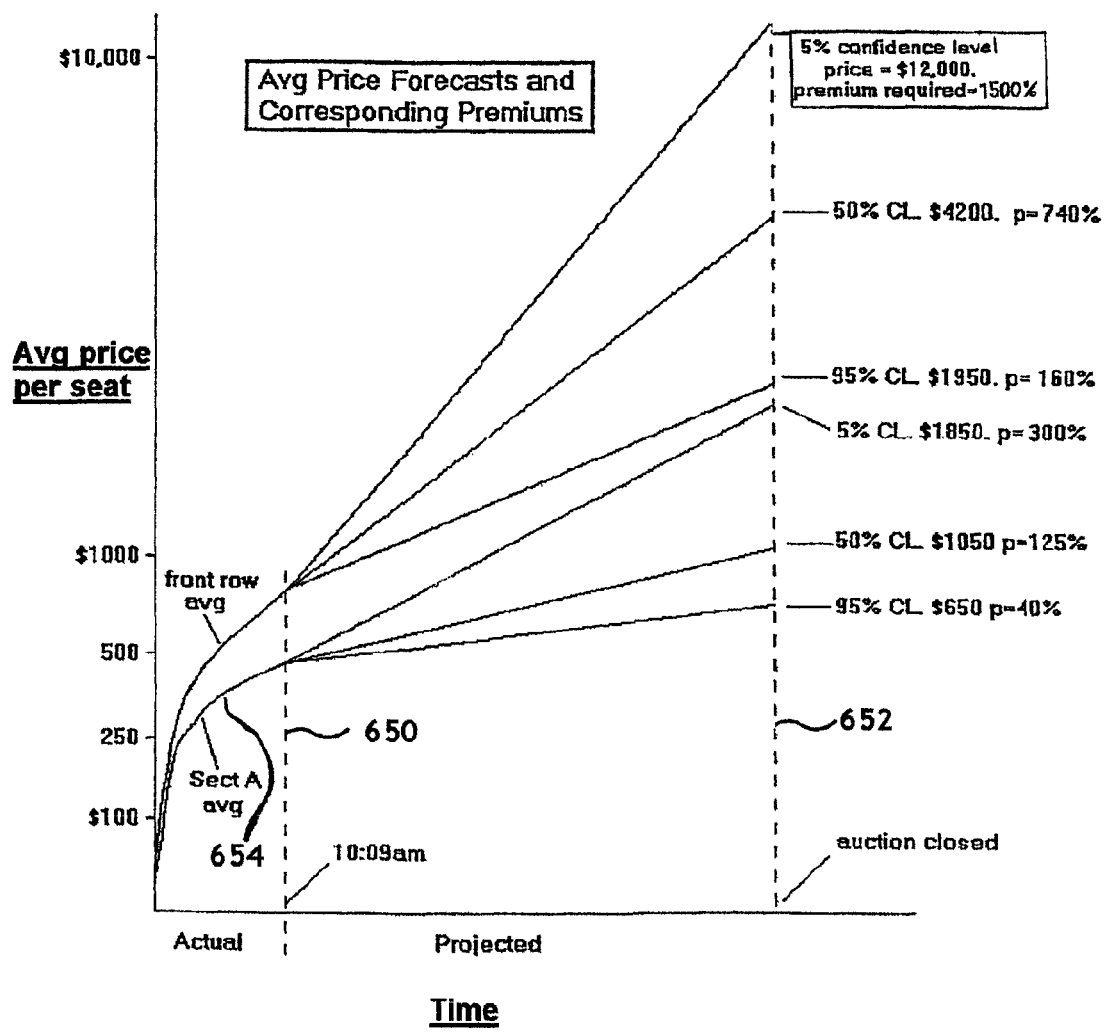
FIG. 26 is a graph of the average price per priority right in an automated priority right auction versus the time over which the auction took place.

FIG. 26 is a graph of the average price per ticket versus the time over which the auction takes place. Dotted line 650 denotes the time at which this graph was created, 10:09 a.m., and separates the graph into a part that is based on actual sales and a part that consists of average price forecasts based upon those actual sales. Dotted line 652 marks the end of the auction, and all lines in the graph that intersect with dotted line 652 are projections of the average price of tickets at the end of the auction. For example, line 654 plots the average price of a seat in Section A in an auction for the right to sit in a seat at an event. As of 10:09 a.m. the average price of a seat in Section A is about $400. A forecasting algorithm has predicted with 95% certainty, based on the rate of growth of the average sale price of a seat in Section A from the start of the auction until 10:09 a.m., that the price of the average seat in Section A at the end of the auction will not be below $650. The algorithm calculates that to obtain this amount for a ticket at 10:09 a.m., the lock-in premium should be set at 40%. Likewise, the forecasting algorithm has predicted with a 50% certainty that the final average price will not be below $1050 and has calculated its related lock-in premium of 125%. The forecasting algorithm has also predicted with a 5% certainty that the final average price will not be below $1850 and has calculated the related lock-in premium of 300%. The auction organizer may use graphs such as FIG. 26 throughout an auction to determine a reasonable lock-in premium amount.

Figure 27:
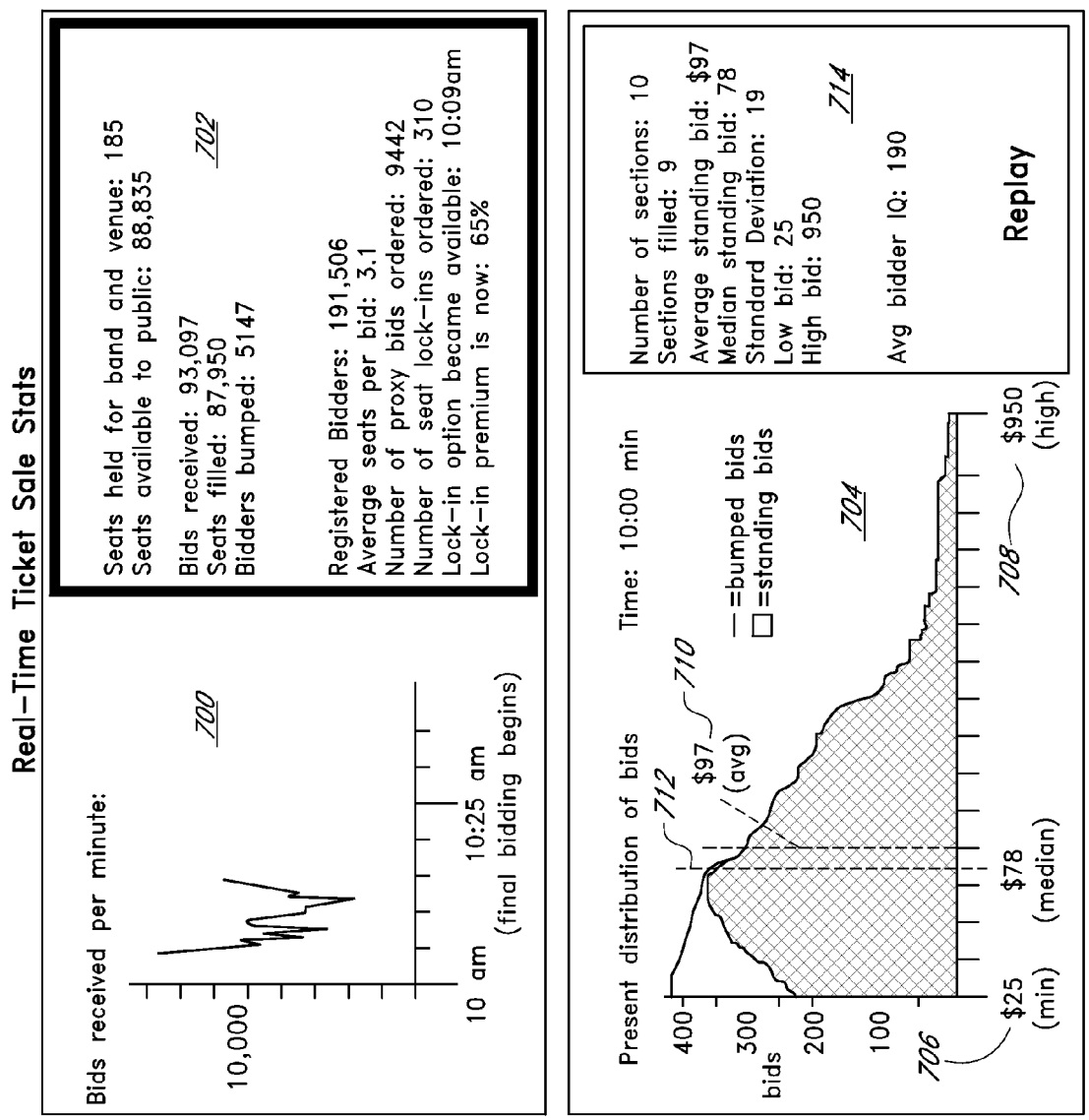
FIG. 27 is a computer display of two graphs and two frames displaying statistics pertaining to an automated priority right auction of the rights to sit in a particular seat at an event.

FIG. 27 contains two graphs displaying real-time ticket sale stats for an auction of the rights to sit in a particular seat at an event. Graph 700 in FIG. 27 plots the number of bids received per minute during the time that the auction takes place. In addition, statistics frame 702 contains numerical data useful to the auction organizer, including the total number of bids received, the total number of bumped bids, the average number of seats per bid, and the number of lock-ins ordered. Graph 704 in FIG. 27 plots the distribution of bids at a certain point of time in the auction. The minimum, maximum, average, and median bid amounts are denoted by label 706, label 708, label 710, and dotted line 712, respectively. Additionally, graph 704 distinguishes between standing bids and bumped bids by graphing each in a different color. The auction organizer may create multiple versions of graph 704 for various times during the auction, enabling the organizer to view the progression of bids during the auction. Statistics frame 714 contains numerical data such as the number of sections filled, the average standing bid amount, the high bid amount, and the low bid amount.

It is to be understood that the above-described embodiments of the invention are• merely illustrative. Other implementations may readily be devised by those of ordinary skill in the art which will embody the principles of the invention and fall within the spirit and scope thereof. For example, the exemplary contiguous ticket algorithm of FIG. 12 may readily be modified to allow repeated movements of a group to ensure contiguous tickets or to allow block-style groupings, or other variations. Moreover, this ensuring of contiguous tickets shown at step 54 of FIG. 4, could be performed as each bid is placed, rather than only at the close of the auction. Likewise, the last ticket cut-off in step 55 of FIG. 4 could be executed with each bid made. Additionally, the auction system may readily be modified to sell each section of seats in succession or at different Internet locations. Other embodiments may provide additional incentives for bidders to bid early in the auction. For example, if the auction is for the right to sit in a particular seat at an event, those bidding within the first ten minutes from the auction opening may be awarded cash value certificates for redemption at the event for concessions or gift shop items. Larger awards may be granted for earlier bids (e.g., $10 for a bid within the first ten minutes after auction opening) and smaller awards may be granted for later bids (e.g., $2 for a bid within the first hour after auction opening). In other alternative embodiments, certain classes of people may be awarded preferential treatment during bidding. For example, alumni bids maybe augmented by a given dollar amount, alumni may given access to a certain portion of the tickets, or alumni may be allowed to place bids after the auction closes. In any event, although auctions for priority rights such as event tickets and golf tee times have been used in the above description, the invention is not limited to systems auctioning those priority rights, and the system may be designed to auction any number of different types of priority rights.

What is claimed is:

1. A method of distributing a plurality of priority rights, the method comprising:
   receiving over a network at a computing system a plurality of bid records from a plurality of users, the bid records including bid amount data, wherein the bid amount data is associated with a quantity of priority rights being bid on;
   correlating, via the computing system, a selected bid record received from a selected user with a subset of priority rights, wherein:
   (a) the subset of priority rights is selected from the plurality of priority rights at least partially based on the selected bid record bid amount data, and
   (b) the subset of priority rights includes a quantity of priority rights that corresponds to the quantity of priority rights being bid on,
   wherein the computing system is configured to perform such correlation;
   and
   distributing the subset of priority rights to the selected user.

2. The method of claim 1, wherein the subset of priority rights consists of one priority right.

3. The method of claim 1, further comprising receiving registration information over the network from the selected user before receiving the selected bid record from the selected user.

4. The method of claim 1, wherein at least a portion of the plurality of bid records are received via the Internet.

5. The method of claim 1, wherein the plurality of priority rights corresponds to a plurality of event tickets.

6. The method of claim 1, further comprising comparing the selected bid record bid amount data with a minimum bid threshold and with a maximum authorization threshold.

7. The method of claim 1, further comprising sending a bid status notification to the selected user over a network.

8. The method of claim 1, further comprising receiving over the network from at least one user an indication that the at least one user agrees to a set of auction rules before accepting a bid from the at least one user.

9. A system configured to distribute a plurality of priority rights, comprising:
   a computing device;
   a program stored in non-transitory tangible memory, that when executed by the computing device, is configured to perform operations comprising:
      receiving a plurality of bid records from a plurality of users, the bid records including bid amount data, wherein the bid amount data is associated with a quantity of priority rights being bid on;
      correlating a selected bid record received from a selected user with a subset of priority rights, wherein:
      (a) the subset of priority rights is selected from the plurality of priority rights at least partially based on the selected bid record bid amount data, and
      (b) the subset of priority rights includes a quantity of priority rights that corresponds to the quantity of priority rights being bid on,
      wherein the system is configured to perform such correlation;
      and
      distributing the subset of priority rights to the selected user.

10. The system of claim 9, wherein the subset of priority rights consists of one priority right.

11. The system of claim 9, the operations further comprising receiving registration information from the selected user before receiving the selected bid record from the selected user.

12. The system of claim 9, wherein at least a portion of the plurality of bid records are received via the Internet.

13. The system of claim 9, wherein the plurality of priority rights corresponds to a plurality of event tickets.

14. The system of claim 9, the operations further comprising comparing the selected bid record bid amount data with a minimum bid threshold and with a maximum authorization threshold.

15. The system of claim 9, the operations further comprising sending a bid status notification to the selected user over a network.

16. The system of claim 9, the operations further comprising receiving over the network from at least one user an indication that the at least one user agrees to a set of auction rules before accepting a bid from the at least one user.

17. A non-transitory computer readable medium storing instructions, that if executed by a computing device, are configured to perform operations comprising:
   receiving a plurality of bid records from a plurality of users, the bid records including bid amount data, wherein the bid amount data is associated with a quantity of priority rights being bid on;
   correlating a selected bid record received from a selected user with a subset of priority rights, wherein
   (a) the subset of priority rights is selected from the plurality of priority rights at least partially based on the selected bid record bid amount data, and
   (b) the subset of priority rights includes a quantity of priority rights that corresponds to the quantity of priority rights being bid on, wherein the computing system is configured to perform such correlation; and
   distributing the subset of priority rights to the selected user.

18. The non-transitory computer readable medium of claim 17, wherein the subset of priority rights consists of one priority right.

19. The non-transitory computer readable medium of claim 17, the operations further comprising receiving registration information from the selected user before receiving the selected bid record from the selected user.

20. The non-transitory computer readable medium of claim 17, wherein at least a portion of the plurality of bid records are received via the Internet.

21. The non-transitory computer readable medium of claim 17, wherein the plurality of priority rights corresponds to a plurality of event tickets.

22. The non-transitory computer readable medium of claim 17, the operations further comprising comparing the selected bid record bid amount data with a minimum bid threshold and with a maximum authorization threshold.

23. The non-transitory computer readable medium of claim 17, the operations further comprising sending a bid status notification to the selected user over a network.

24. The non-transitory computer readable medium of claim 17, the operations further comprising receiving over the network from at least one user an indication that the at least one user agrees to a set of auction rules before accepting a bid from the at least one user.

* * * * *